(12) United States Patent
Tsou et al.

(10) Patent No.: US 12,436,325 B2
(45) Date of Patent: Oct. 7, 2025

(54) OPTICAL FILTER STRUCTURE OF ARBITRARY COMBINATION OF UV, R, G, B, AND IR, AND MANUFACTURING METHOD THEREOF

(71) Applicant: Kingray Technology Co., Ltd., Zhudong Township, Hsinchu County (TW)

(72) Inventors: Cheng-Hsing Tsou, Zhudong Township (TW); Wei-Hao Cheng, Zhudong Township (TW); Pei-Yuan Ni, Zhudong Township (TW)

(73) Assignee: KINGRAY TECHNOLOGY CO., LTD., Zhudong Township, Hsinchu County (TW)

( * ) Notice: Subject to any disclaimer, the term of this patent is extended or adjusted under 35 U.S.C. 154(b) by 583 days.

(21) Appl. No.: 17/890,283

(22) Filed: Aug. 18, 2022

(65) Prior Publication Data

US 2023/0070703 A1 Mar. 9, 2023

(30) Foreign Application Priority Data

Sep. 2, 2021 (TW) .................................. 110132659

(51) Int. Cl.
*G02B 5/20* (2006.01)
*G02B 5/28* (2006.01)

(52) U.S. Cl.
CPC .............. *G02B 5/208* (2013.01); *G02B 5/207* (2013.01); *G02B 5/285* (2013.01)

(58) Field of Classification Search
CPC ........ G02B 5/208; G02B 5/207; G02B 5/285; G02B 5/201; G02B 5/22; H10F 39/8053; B32B 9/04; C23C 14/04
See application file for complete search history.

(56) References Cited

U.S. PATENT DOCUMENTS

| 2018/0260929 A1* | 9/2018 | Belogolovy | .......... G06T 3/4015 |
| 2019/0165021 A1* | 5/2019 | Ono | ........................ G02B 5/208 |
| 2022/0028909 A1* | 1/2022 | Kim | ..................... H04N 25/131 |

* cited by examiner

*Primary Examiner* — Stewart A Fraser
(74) *Attorney, Agent, or Firm* — Leong C. Lei

(57) ABSTRACT

An optical filter structure of an arbitrary combination of UV, R, G, B, and IR includes a substrate and a filter layer. The substrate is a wafer semiconductor sensor device and a product of light-transmitting device. The filter layer is formed on a surface of the substrate and is formed of a plurality of basic units arranged in an array. Each of the basic units includes a plurality of pixel filter films formed through vacuum coating, and the plurality of pixel filter films include an arbitrary combination of multiple ones of a UV pixel filter film, an R pixel filter film, a G pixel filter film, a B pixel filter film, and an IR pixel filter film, such that the plurality of pixel filter films allow light of corresponding wavelengths to pass therethrough.

19 Claims, 9 Drawing Sheets

OPTICAL FILTER STRUCTURE OF ARBITRARY COMBINATION OF UV, R, G, B, AND IR, AND MANUFACTURING METHOD THEREOF

TECHNICAL FIELD OF THE INVENTION

The present invention relates to a technical field of an optical filter structure that is applicable to a sensor chip of an optical sensor, such as an ambient light sensor (ALS), a proximity sensor (PS), an RGB color temperature sensor, and a hand gesture sensor, and a manufacturing method thereof, and more particularly to an optical filter structure of arbitrary combination of UV, R, G, B, and IR that betters filter film uniformity (uniformity±5 nm) and provides a wider wave band for formation of more images of different wavelengths to realize resolution of higher sensitivity for satisfying optical specifications, and a manufacturing method thereof.

DESCRIPTION OF THE PRIOR ART

Known optical sensors, such as visible light camera module, use an infrared (IR) cut-off filter to filter out undesired near infrared light of low frequencies, in order to prevent influence on the visible light components by infrared light that results in fake color or rippling. However, no ultraviolet (US) pixels and IR pixels are found in such known visible light camera modules.

A known color filter plate and a manufacturing method thereof are disclosed in for example Taiwan Patent Application No. 100112527, in which inkjet printing is adopted and the color filter film has a thickness around 5 micrometers. Consumption of pigment photoresist liquids is wasting, and resolution and location repetition are relatively poor, and the manufacturing process is increased with the size of substrates. Initially, coating of photoresist is a combination of tube and spin coating, which is then evolved into a combination of slit and spin coating, of which the purpose is to reduce the consumption of photoresist. In the future, the size of the substrate is getting larger and this would make uniformity of the color filter film incapable of meeting the specification requirement (±2%), and optical transmittance and wavelength do not satisfy specification requirement (cut-off band lower than 1% transmission rate). Relatively high cut-off band transmission rate makes noises. Known metal color filters use a material of silver, which is environmentally unstable and is easy to corrode.

SUMMARY OF THE INVENTION

The primary objective of the present invention is to effectively resolve the problems that the known color filter, and the manufacturing method thereof, do not achieve specification requirement (±2%) for filter film uniformity in a large-sized substrate and optical transmittance and wavelength do not meet specification requirements (cut-off band lower than 1% transmission rate).

The present invention provides an optical filter structure of an arbitrary combination of UV, R, G, B, and IR, comprising a substrate and a filter layer. The substrate is a wafer semiconductor sensor device and a product of light-transmitting device. The filter layer is formed on a surface of the substrate and is formed of a plurality of basic units arranged in an array. Each of the basic units comprises a plurality of pixel filter films formed through vacuum coating, and the plurality of pixel filter films comprise an arbitrary combination of multiple ones of a UV pixel filter film, an R pixel filter film, a G pixel filter film, a B pixel filter film, and an IR pixel filter film, such that the plurality of pixel filter films allow light of corresponding wavelengths to pass therethrough.

The present invention provides a method for manufacturing an optical filter structure of an arbitrary combination of UV, R, G, B, and IR, comprising (a) forming photoresist mask on substrate: forming a photoresist mask on a surface of a substrate, such that a plurality of hollowed film-coating zones are formed in portions of the photoresist mask in which pixel filter films are to be coated; (b) vacuum coating: performing an operation of vacuum coating to form, in the film-coating zones, a plurality of pixel filter films, which are formed by alternately stacking a plurality of rubidium (Rb) layers and a plurality of high refractive index layers, which are of different thicknesses; (c) coating photoresist: coating photoresist on the hollowed film-coating zones that have been coated with the pixel filter films, in order to seal the hollowed film-coating zones; (d) etching: performing an operation of etching to form a plurality of additional hollowed film-coating zones, in which a plurality of additional pixel filter films are to be coated, in portions of the photoresist mask; (e) vacuum coating again: performing an operation of vacuum coating to form, in the plurality of additional film-coating zones formed through the operation of etching, a plurality of additional pixel filter films, which are formed by alternately stacking a plurality of rubidium (Rb) layers and a plurality of high refractive index layers, which are of different thicknesses; and (f) removing photoresist mask: removing the photoresist mask to complete the process.

Continuing from the above, after step (e), steps (c)-(e) are selectively repeated before step (f) is performed, so that the optical filter structure is formed as a combination of three or multiple arbitrary ones of pixel filter films.

The optical filter structure of an arbitrary combination of UV, R, G, B, and IR and the manufacturing method thereof provided in the present invention, which applies a process of vacuum coating in combination with photoresist masking, so that even it is applied to manufacturing a large-sized substrate, uniformity can reach a level of being below ±5 nm, satisfying optical specification requirement for cut-off transmission rate being lower than 1%. Such an optical filter structure of an arbitrary combination of UV, R, G, B, and IR features higher transmittance and a narrower passband, resulting in more vivid and brighter colors. Further, when it is applied to a sensor chip of an optical sensor, such as an ambient light sensor (ALS), a proximity sensor (PS), a RGB color temperature sensor, and a hand gesture sensor, the response time is faster and the color recognizability and adjustment sensitivity are significantly improved as compared to known products of the kind, and brightness rendering for light sensitivity and contrast can be greatly enhanced. The present invention has been applied by combining a sensor thereof with artificial intelligence (AI) to accurately determine degree of maturity of an internal layer of a fruit (such as an orange or a kiwifruit) by projecting light toward the fruit, so that maturity degree/sorting of fruits can be fulfill and the cost of conventional way of human recognition can be greatly reduced.

DETAILED DESCRIPTION OF THE PREFERRED EMBODIMENT

Figure 1:
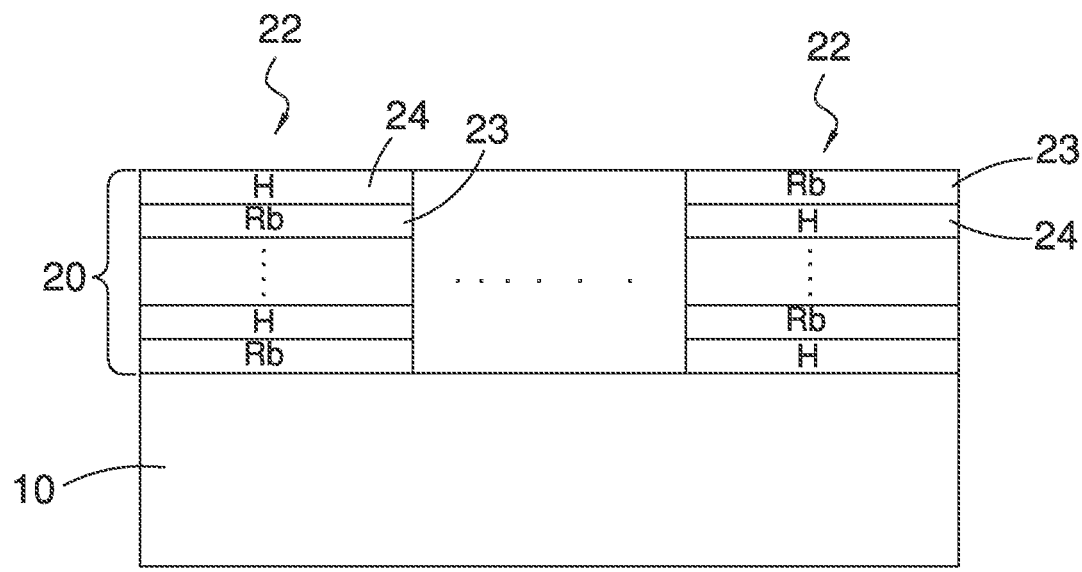
FIG. 1 is a schematic structure view of the present invention.
Figure 2:
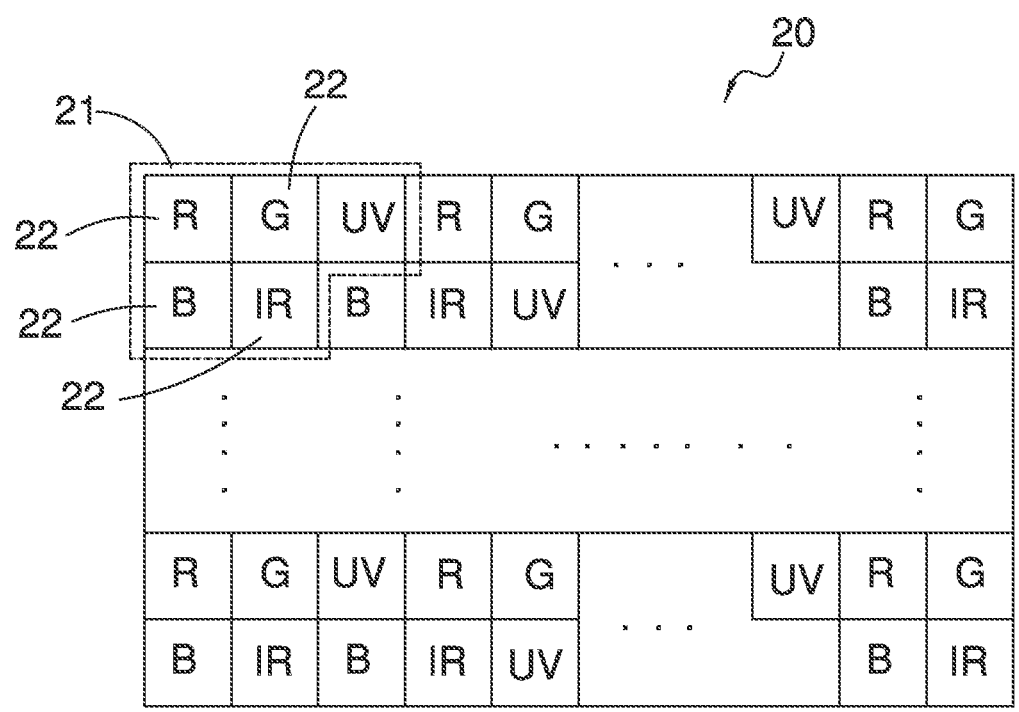
FIG. 2 is a schematic view showing an arrangement of basic units of a color filter layer according to the present invention.

Referring to FIGS. 1 and 2, an optical filter structure of an arbitrary combination of ultraviolet (UV), red (R), green (G), blue (B), and infrared (IR) according to the present invention is shown, which comprises a substrate 10 and a filter layer 20.

The substrate 10 is a wafer semiconductor sensor device.

The filter layer 20 is formed on a surface of the substrate 10 and comprises a plurality of basic units 21 arranged in an array. Each of the basic units 21 comprises a plurality of pixel filter films 22 formed by means of vacuum coating. The plurality of pixel filter films 22 comprises multiple arbitrary ones of a UV pixel filter film, an R pixel filter film, a G pixel filter film, a B pixel filter film, and an IR pixel filter film, and such multiple ones of the pixel filter films allow only light of corresponding wavelengths to pass therethrough.

In the present invention, ways of combining the plurality of pixel filter films 22 for each of the basic units 21 can be a combination of two arbitrary ones, three arbitrary ones, or multiple arbitrary ones of the UV pixel filter film, the R pixel filter film, a G pixel filter film, a B pixel filter film, and an IR pixel filter film, and a combination of four of them is taken as an example for illustrating the instant embodiment.

The UV pixel filter film is formed by alternately stacking a plurality of rubidium (Rb) layers 23 and a plurality of high refractive index layers 24 having refractive indexes higher than those of the rubidium (Rb) layers, such that a passband is formed in a wavelength range of 300 nm to 1100 nm, and a passband central wavelength is 300 nm to 400 nm, and transmittance of a remaining cut-off band is averagely lower than 1%, and transmittance of the passband central wavelength is greater than 50% at an incident angle of 0°.

The R pixel filter film is formed by alternately stacking a plurality of rubidium (Rb) layers 23 and a plurality of high refractive index layers 24 having refractive indexes higher than those of the rubidium (Rb) layers, such that a passband is formed in a wavelength range of 300 nm to 1100 nm, and a passband central wavelength is 580 nm to 740 nm, and transmittance of a remaining cut-off band is lower than 1%, and transmittance of the passband central wavelength is greater than 55% at an incident angle of 0°.

The G pixel filter film is formed by alternately stacking a plurality of rubidium (Rb) layers 23 and a plurality of high refractive index layers 24 having refractive indexes higher than those of the rubidium (Rb) layers, such that a passband is formed in a wavelength range of 300 nm to 1100 nm, and a passband central wavelength is 500 nm to 565 nm, and transmittance of a remaining cut-off band is lower than 1%, and transmittance of the passband central wavelength is greater than 55% at an incident angle of 0°.

The B pixel filter film is formed by alternately stacking a plurality of rubidium (Rb) layers 23 and a plurality of high refractive index layers 24 having refractive indexes higher than those of the rubidium (Rb) layers, such that a passband is formed in a wavelength range of 300 nm to 1100 nm, and a passband central wavelength is 400 nm to 500 nm, and transmittance of a remaining cut-off band is lower than 1%, and transmittance of the passband central wavelength is greater than 55% at an incident angle of 0°.

The IR pixel filter film is formed by alternately stacking a plurality of rubidium (Rb) layers 23 and a plurality of high refractive index layers 24 having refractive indexes higher than those of the rubidium (Rb) layers, such that a passband is formed in a wavelength range of 300 nm to 1100 nm, and the central wavelength in a wavelength range of infrared 800 nm to 1100 nm only has a portion or partly overlapped to form a passband, and transmittance of a remaining cut-off band is lower than 1%, and transmittance of the passband central wavelength is greater than 30% at an incident angle of 0°.

In the plurality of pixel filter films 22 discussed above, the plurality of rubidium (Rb) layers 23 have refractive indexes of 0.25 to 0.13 and extinction coefficients of 0.24 to 5.58 in a wavelength range of 350 nm to 2000 nm. The plurality of high refractive index layers 24 can be any one of titanium pentoxide ($Ti_3O_5$), titanium dioxide ($TiO_2$), niobium pentoxide ($Nb_2O_5$), tantalum pentoxide ($Ta_2O_5$-5#), a mixture film material ($H_4$), and a combination thereof. Further, the plurality of high refractive index layers 24 have refractive indexes greater than 1.6 and extinction coefficient close to 0 in a wavelength range of 350 nm to 1100 nm. The UV pixel filter film, the R pixel filter film, the G pixel filter film, the B pixel filter film, and the IR pixel filter film are formed by combining multiple rubidium (Rb) layers 23 and multiple high refractive index layers 24 having different thicknesses and different numbers of layer forms.

Examples of various structural conditions of the UV pixel filter film, the R pixel filter film, the G pixel filter film, the B pixel filter film, and the IR pixel filter film will be described below.

UV pixel filter film: the UV pixel filter film is formed by alternately stacking a plurality of rubidium (Rb) layers 23 and a plurality of high refractive index layers 24, wherein the plurality of high refractive index layers 24 can be respectively any one of titanium pentoxide ($Ti_3O_5$), titanium dioxide ($TiO_2$), niobium pentoxide ($Nb_2O_5$), tantalum pentoxide ($Ta_2O_5$-5#), and a mixture film material ($H_4$), and as an example, the titanium pentoxide ($Ti_3O_5$) layers have a refractive index greater than 1.6 and extinction coefficient close to 0 in a wavelength range of 350 nm to 1100 nm. The rubidium (Rb) layers have a refractive index of 0.25 to 0.13 and extinction coefficient of 0.24 to 5.58 in a wavelength range of 350 nm to 2000 nm. The structural conditions are as follows:

A first layer of $Ti_3O_5$ has a thickness of 82.56 nm; a second layer of Rb has a thickness of 42.79 nm; a third layer of $Ti_3O_5$ has a thickness of 18.36 nm; a fourth layer of Rb has a thickness of 61.82 nm; a fifth layer of $Ti_3O_5$ has a thickness of 92.26 nm; a sixth layer of Rb has a thickness of 44.13 nm; a seventh layer of $Ti_3O_5$ has a thickness of 26.52 nm; an eighth layer of Rb has a thickness of 54.26 nm; a ninth layer of Ti₃O₅ has a thickness of 29.99 nm; a tenth layer of Rb has a thickness of 29.32 nm; an eleventh layer of Ti₃O₅ has a thickness of 30.24 nm; a twelfth layer of Rb has a thickness of 55.54 nm; a thirteenth layer of Ti₃O₅ has a thickness of 154.53 nm; a fourteenth layer of Rb has a thickness of 61.42 nm; a fifteenth layer of Ti₃O₅ has a thickness of 83.48 nm; a sixteenth layer of Rb has a thickness of 60.76 nm; and a seventeenth layer of Ti₃O₅ has a thickness of 76.12 nm;

or, a first layer of TiO₂ has a thickness of 82.87 nm; a second layer Rb has a thickness of 42.79 nm; a third layer of TiO₂ has a thickness of 18.39 nm; a fourth layer Rb has a thickness of 61.82 nm; a fifth layer of TiO₂ has a thickness of 92.44 nm; a sixth layer Rb has a thickness of 44.13 nm; a seventh layer of TiO₂ has a thickness of 26.57 nm; an eighth layer Rb has a thickness of 54.26 nm; a ninth layer of TiO₂ has a thickness of 30.05 nm; a tenth layer Rb has a thickness of 29.32 nm; an eleventh layer of TiO₂ has a thickness of 30.3 nm; a twelfth layer Rb has a thickness of 55.54 nm; a thirteenth layer of TiO₂ has a thickness of 154.83 nm; a fourteenth layer of Rb has a thickness of 61.42 nm; a fifteenth layer of TiO₂ has a thickness of 83.64 nm; a sixteenth layer of Rb has a thickness of 60.76 nm; and a seventeenth layer material of TiO₂ has a thickness of 76.27 nm;

or, a first layer of Nb₂O₅ has a thickness of 85.46 nm; a second layer of Rb has a thickness of 42.79 nm; a third layer of Nb₂O₅ has a thickness of 19 nm; a fourth layer of Rb has a thickness of 61.82 nm; a fifth layer of Nb₂O₅ has a thickness of 95.5 nm; a sixth layer of Rb has a thickness of 44.13 nm; a seventh layer of Nb₂O₅ has a thickness of 44.13 nm; an eighth layer of Rb has a thickness of 54.26 nm; a ninth layer of Nb₂O₅ has a thickness of 31.05 nm; a tenth layer of Rb has a thickness of 29.32 nm; an eleventh layer of Nb₂O₅ has a thickness of 31.3 nm; a twelfth layer of Rb has a thickness of 55.54 nm; a thirteenth layer of Nb₂O₅ has a thickness of 159.96 nm; a fourteenth layer of Rb has a thickness of 61.42 nm; a fifteenth layer of Nb₂O₅ has a thickness of 86.41 nm; a sixteenth layer of Rb has a thickness of 60.76 nm; and a seventeenth layer material of Nb₂O₅ has a thickness of 78.8 nm;

or, a first layer of Ta₂O₅ has a thickness of 93.58 nm; a second layer of Rb has a thickness of 42.79 nm; a third layer of Ta₂O₅ has a thickness of 20.81 nm; a fourth layer of Rb has a thickness of 61.82 nm; a fifth layer of Ta₂O₅ has a thickness of 104.58 nm; a sixth layer of Rb has a thickness of 44.13 nm; a seventh layer of Ta₂O₅ has a thickness of 30.06 nm; an eighth layer of Rb has a thickness of 54.26 nm; a ninth layer of Ta₂O₅ has a thickness of 34 nm; a tenth layer of Rb has a thickness of 29.32 nm; an eleventh layer of Ta₂O₅ has a thickness of 34.28 nm; a twelfth layer of Rb has a thickness of 55.54 nm; a thirteenth layer of Ta₂O₅ has a thickness of 175.16 nm; a fourteenth layer of Rb has a thickness of 61.42 nm; a fifteenth layer of Ta₂O₅ has a thickness of 94.62 nm; a sixteenth layer of Rb has a thickness of 60.76 nm; and a seventeenth layer material of Ta₂O₅ has a thickness of 86.29 nm;

or, a first layer of H₄ has a thickness of 95.57 nm; a second layer of Rb has a thickness of 42.79 nm; a third layer of H₄ has a thickness of 21.25 nm; a fourth layer of Rb has a thickness of 61.82 nm; a fifth layer of H₄ has a thickness of 106.8 nm; a sixth layer of Rb has a thickness of 44.13 nm; a seventh layer of H₄ has a thickness of 30.7 nm; an eighth layer of Rb has a thickness of 54.26 nm; a ninth layer of H₄ has a thickness of 34.72 nm; a tenth layer of Rb has a thickness of 29.32 nm; an eleventh layer of H₄ has a thickness of 35.01 nm; a twelfth layer of Rb has a thickness of 55.54 nm; a thirteenth layer of H₄ has a thickness of 178.89 nm; a fourteenth layer of Rb has a thickness of 61.42 nm; a fifteenth layer of H₄ has a thickness of 96.64 nm; a sixteenth layer of Rb has a thickness of 60.76 nm; and a seventeenth layer material of H₄ has a thickness of 88.12 nm.

Figure 3:
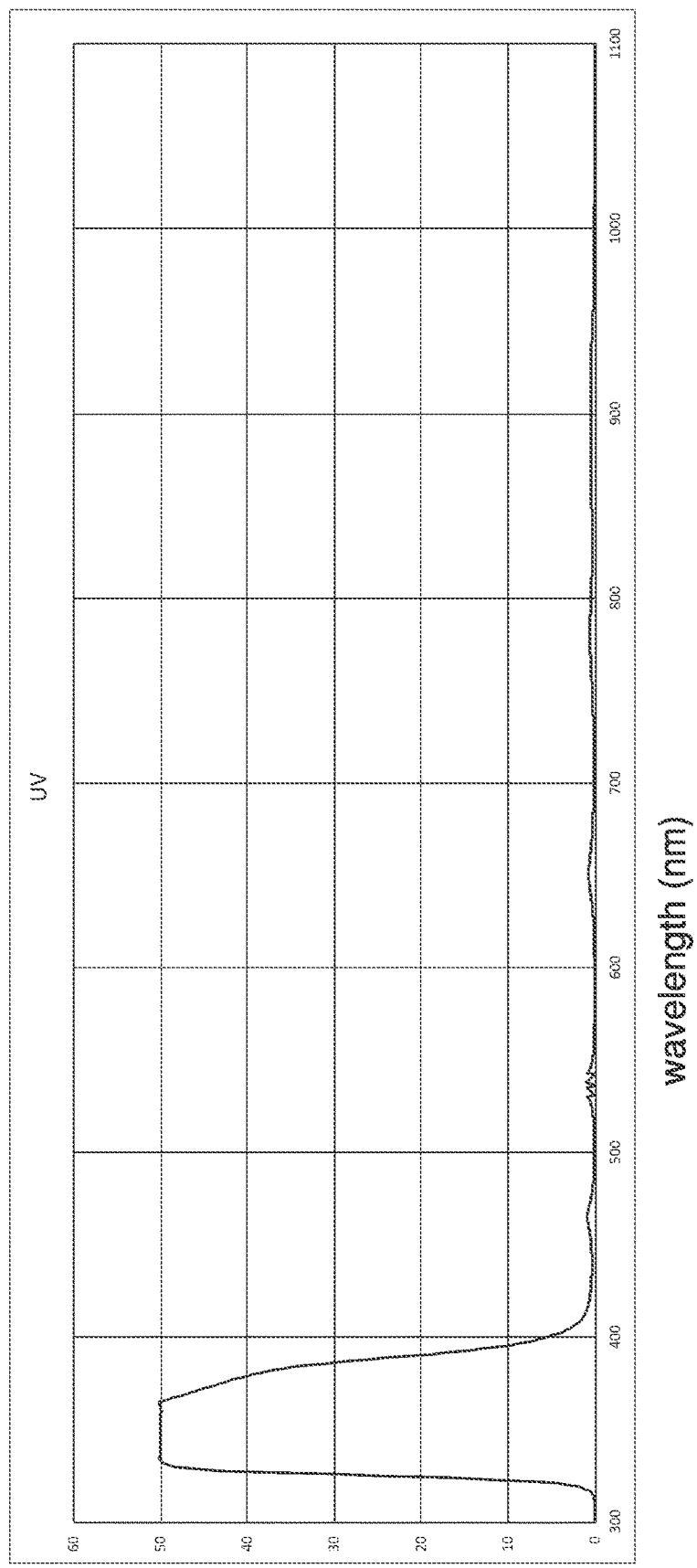
FIG. 3 is a spectrum diagram of a UV pixel filter film of the present invention.

As shown in FIG. 3, the UV pixel filter film forms a passband in a wavelength range of 300 nm to 1100 nm, and the passband central wavelength is 300 nm to 400 nm, and average transmittance of the remaining cut-off band is lower than 1%, and transmittance of the passband central wavelength is greater than 50% at an incident angle of 0°.

R pixel filter film: the R pixel filter film is formed by alternately stacking a plurality of rubidium (Rb) layers 23 and high refractive index layers 24, wherein the high refractive index layers 24 can be respectively any one of titanium pentoxide (Ti₃O₅), titanium dioxide (TiO₂), niobium pentoxide (Nb₂O₅), tantalum pentoxide (Ta₂O₅-5#), and a mixture film material (H₄), and as an example, the titanium pentoxide (Ti₃O₅) layers have a refractive index greater than 1.6 and extinction coefficient close to 0 in a wavelength range of 350 nm to 1100 nm. The rubidium (Rb) layers have a refractive index of 0.25 to 0.13 and extinction coefficient of 0.24 to 5.58 in a wavelength range of 350 nm to 2000 nm. The structural conditions are as follows:

A first layer of Ti₃O₅ has a thickness of 66.02 nm; a second layer of Rb has a thickness of 7.96 nm; a third layer of Ti₃O₅ has a thickness of 128.05 nm; a fourth layer of Rb has a thickness of 52.37 nm; a fifth layer of Ti₃O₅ has a thickness of 120.7 nm; a sixth layer of Rb has a thickness of 61.05 nm; a seventh layer of Ti₃O₅ has a thickness of 123.81 nm; an eighth layer of Rb has a thickness of 59.29 nm; a ninth layer of Ti₃O₅ has a thickness of 34.09 nm; a tenth layer of Rb has a thickness of 61.6 nm; an eleventh layer of Ti₃O₅ has a thickness of 37.04 nm; a twelfth layer of Rb has a thickness of 55.14 nm; a thirteenth layer of Ti₃O₅ has a thickness of 35.34 nm; a fourteenth layer of Rb has a thickness of 53.51 nm; and a fifteenth layer of Ti₃O₅ has a thickness of 107.1 nm;

or, a first layer of TiO₂ has a thickness of 66.35 nm; a second layer of Rb has a thickness of 7.96 nm; a third layer of TiO₂ has a thickness of 128.69 nm; a fourth layer of Rb has a thickness of 52.37 nm; a fifth layer of TiO₂ has a thickness of 121.3 nm; a sixth layer of Rb has a thickness of 61.05 nm; a seventh layer of TiO₂ has a thickness of 124.42 nm; an eighth layer of Rb has a thickness of 59.29 nm; a ninth layer of TiO₂ has a thickness of 34.26 nm; a tenth layer of Rb has a thickness of 61.6 nm; an eleventh layer of TiO₂ has a thickness of 37.23 nm; a twelfth layer of Rb has a thickness of 54.14 nm; a thirteenth layer of TiO₂ has a thickness of 35.52 nm; a fourteenth layer of Rb has a thickness of 53.51 nm; and a fifteenth layer of TiO₂ has a thickness of 107.63 nm;

or, a first layer of Nb₂O₅ has a thickness of 67.27 nm; a second layer of Rb has a thickness of 7.96 nm; a third layer of Nb₂O₅ has a thickness of 130.47 nm; a fourth layer of Rb has a thickness of 52.37 nm; a fifth layer of Nb₂O₅ has a thickness of 122.98 nm; a sixth layer of Rb has a thickness of 61.05 nm; a seventh layer of Nb₂O₅ has a thickness of 126.15 nm; an eighth layer of Rb has a thickness of 59.29 nm; a ninth layer of Nb₂O₅ has a thickness of 34.73 nm; a tenth layer of Rb has a thickness of 61.1 nm; an eleventh layer of $Nb_2O_5$ has a thickness of 37.74 nm; a twelfth layer of Rb has a thickness of 54.14 nm; a thirteenth layer of $Nb_2O_5$ has a thickness of 36.01 nm; a fourteenth layer of Rb has a thickness of 53.51 nm; and a fifteenth layer of $Nb_2O_5$ has a thickness of 109.12 nm;

or, a first layer of $Ta_2O_5$-5# has a thickness of 73.07 nm; a second layer of Rb has a thickness of 7.96 nm; a third layer of $Ta_2O_5$-5# has a thickness of 141.72 nm; a fourth layer of Rb has a thickness of 52.37 nm; a fifth layer of $Ta_2O_5$-5# has a thickness of 133.58 nm; a sixth layer of Rb has a thickness of 61.05 nm; a seventh layer of $Ta_2O_5$-5# has a thickness of 137.02 nm; an eighth layer of Rb has a thickness of 59.29 nm; a ninth layer of $Ta_2O_5$-5# has a thickness of 37.73 nm; a tenth layer of Rb has a thickness of 61.6 nm; an eleventh layer of $Ta_2O_5$-5# has a thickness of 41 nm; a twelfth layer of Rb has a thickness of 54.14 nm; a thirteenth layer of $Ta_2O_5$-5# has a thickness of 39.11 nm; a fourteenth layer of Rb has a thickness of 53.51 nm; and a fifteenth layer of $Ta_2O_5$-5# has a thickness of 118.53 nm;

or, a first layer of $H_4$ has a thickness of 75.04 nm; a second layer of Rb has a thickness of 7.96 nm; a third layer of $H_4$ has a thickness of 145.55 nm; a fourth layer of Rb has a thickness of 52.37 nm; a fifth layer of $H_4$ has a thickness of 137.19 nm; a sixth layer of Rb has a thickness of 61.05 nm; a seventh layer of $H_4$ has a thickness of 140.73 nm; an eighth layer of Rb has a thickness of 59.29 nm; a ninth layer of $H_4$ has a thickness of 38.75 nm; a tenth layer of Rb has a thickness of 61.6 nm; an eleventh layer of $H_4$ has a thickness of 42.1 nm; a twelfth layer of Rb has a thickness of 54.14 nm; a thirteenth layer of $H_4$ has a thickness of 40.17 nm; a fourteenth layer of Rb has a thickness of 53.51 nm; and a fifteenth layer of $H_4$ has a thickness of 121.73 nm.

Figure 4:
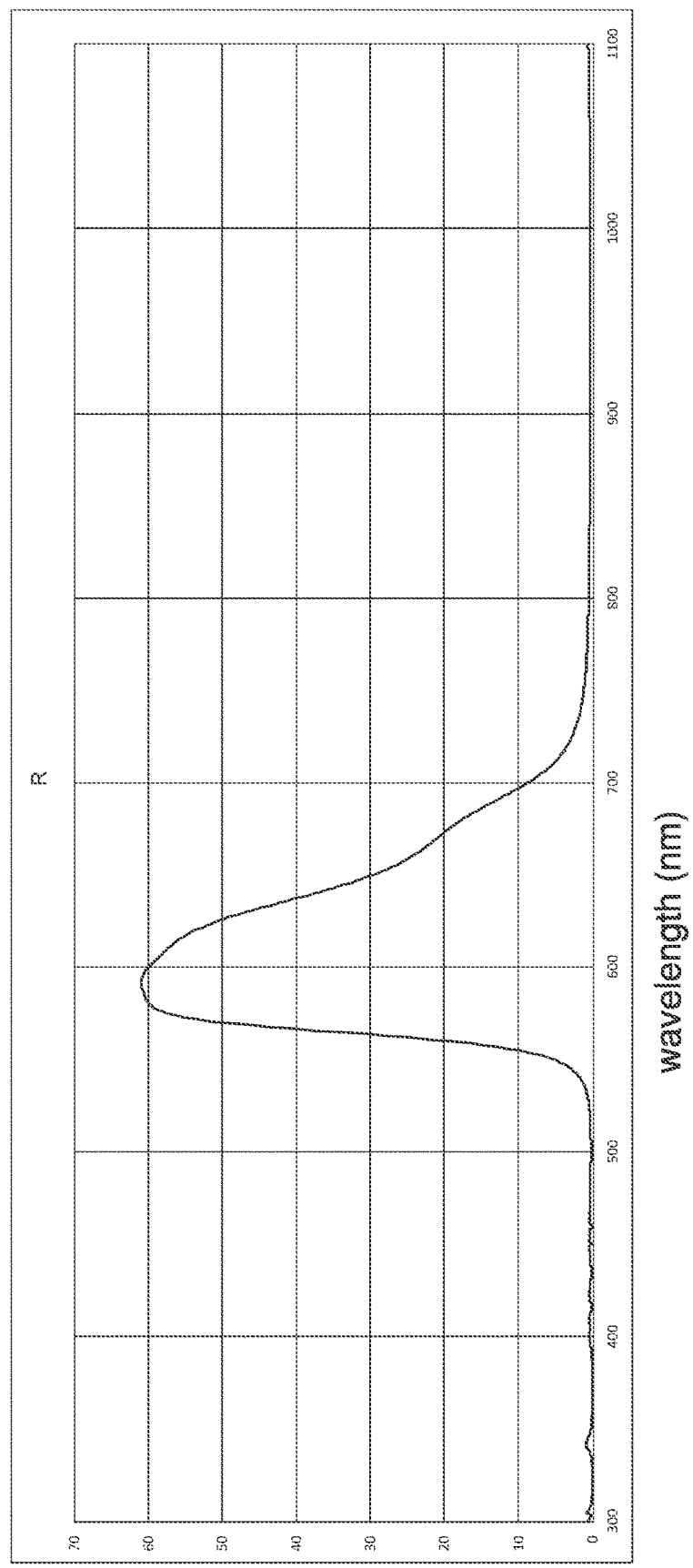
FIG. 4 is a spectrum diagram of an R pixel filter film of the present invention.

As shown in FIG. 4, the R pixel filter film forms a passband in a wavelength range of 300 nm to 1100 nm, and the passband central wavelength is 580 nm to 740 nm, and transmittance of the remaining cut-off band is lower than 1%, and transmittance of the passband central wavelength is greater than 55% at an incident angle of 0°.

G pixel filter film: the G pixel filter film is formed by alternately stacking a plurality of rubidium (Rb) layers 23 and high refractive index layers 24, wherein the high refractive index layers 24 can be respectively any one of titanium pentoxide ($Ti_3O_5$), titanium dioxide ($TiO_2$), niobium pentoxide ($Nb_2O_5$), tantalum pentoxide ($Ta_2O_5$), and a mixture film material ($H_4$), and as an example, the titanium pentoxide ($Ti_3O_5$) layers have a refractive index greater than 1.6 and extinction coefficient close to 0 in a wavelength range of 350 nm to 1100 nm. The rubidium (Rb) layers have a refractive index of 0.25 to 0.13 and extinction coefficient of 0.24 to 5.58 in a wavelength range of 350 nm to 2000 nm. The structural conditions are as follows:

Ae first layer of $Ti_3O_5$ has a thickness of 37.73 nm; a second layer of Rb has a thickness of 1.13 nm; a third layer of $Ti_3O_5$ has a thickness of 435.81 nm; a fourth layer of Rb has a thickness of 27.15 nm; a fifth layer of $Ti_3O_5$ has a thickness of 272.27 nm; a sixth layer of Rb has a thickness of 54.95 nm; a seventh layer of $Ti_3O_5$ has a thickness of 66.34 nm; an eighth layer of Rb has a thickness of 26.03 nm; a ninth layer of $Ti_3O_5$ has a thickness of 61.25 nm; a tenth layer of Rb has a thickness of 70.15 nm; an eleventh layer of $Ti_3O_5$ has a thickness of 159.31 nm; a twelfth layer of Rb has a thickness of 70.11 nm; a thirteenth layer of $Ti_3O_5$ has a thickness of 44.67 nm; a fourteenth layer of Rb has a thickness of 64.2 nm; and a fifteenth layer of $Ti_3O_5$ has a thickness of 137.9 nm;

or, a first layer of $TiO_2$ has a thickness of 37.73 nm; a second layer of Rb has a thickness of 1.13 nm; a third layer of $TiO_2$ has a thickness of 435.84 nm; a fourth layer of Rb has a thickness of 27.15 nm; a fifth layer of $TiO_2$ has a thickness of 272.28 nm; a sixth layer of Rb has a thickness of 54.95 nm; a seventh layer of $TiO_2$ has a thickness of 66.34 nm; an eighth layer of Rb has a thickness of 26.03 nm; a ninth layer of $TiO_2$ has a thickness of 61.25 nm; a tenth layer of Rb has a thickness of 70.15 nm; an eleventh layer of $TiO_2$ has a thickness of 159.32 nm; a twelfth layer of Rb has a thickness of 70.11 nm; a thirteenth layer of $TiO_2$ has a thickness of 44.67 nm; a fourteenth layer of Rb has a thickness of 64.2 nm; and a fifteenth layer of $TiO_2$ has a thickness of 137.9 nm;

or, a first layer of $Nb_2O_5$ has a thickness of 38.24 nm; a second layer of Rb has a thickness of 1.13 nm; a third layer of $Nb_2O_5$ has a thickness of 441.74 nm; a fourth layer of Rb has a thickness of 27.15 nm; a fifth layer of $Nb_2O_5$ has a thickness of 275.97 nm; a sixth layer of Rb has a thickness of 54.95 nm; a seventh layer of $Nb_2O_5$ has a thickness of 67.26 nm; an eighth layer of Rb has a thickness of 26.03 nm; a ninth layer of $Nb_2O_5$ has a thickness of 62.08 nm; a tenth layer of Rb has a thickness of 70.15 nm; an eleventh layer of $Nb_2O_5$ has a thickness of 161.48 nm; a twelfth layer of Rb has a thickness of 70.11 nm; a thirteenth layer of $Nb_2O_5$ has a thickness of 45.28 nm; a fourteenth layer of Rb has a thickness of 64.2 nm; and a fifteenth layer of $Nb_2O_5$ has a thickness of 139.77 nm;

or, a first layer of $Ta_2O_5$-5# has a thickness of 41.04 nm; a second layer of Rb has a thickness of 1.13 nm; a third layer of $Ta_2O_5$-5# has a thickness of 474.13 nm; a fourth layer of Rb has a thickness of 27.15 nm; a fifth layer of $Ta_2O_5$-5# has a thickness of 296.21 nm; a sixth layer of Rb has a thickness of 54.95 nm; a seventh layer of $Ta_2O_5$-5# has a thickness of 72.17 nm; an eighth layer of Rb has a thickness of 26.03 nm; a ninth layer of $Ta_2O_5$-5# has a thickness of 66.63 nm; a tenth layer of Rb has a thickness of 70.15 nm; an eleventh layer of $Ta_2O_5$-5# has a thickness of 173.32 nm; a twelfth layer of Rb has a thickness of 70.11 nm; a thirteenth layer of $Ta_2O_5$-5# has a thickness of 48.6 nm; a fourteenth layer of Rb has a thickness of 64.2 nm; and a fifteenth layer of $Ta_2O_5$-5# has a thickness of 150.02 nm;

or, a first layer of $H_4$ has a thickness of 41.99 nm; a second layer of Rb has a thickness of 1.13 nm; a third layer of $H_4$ has a thickness of 485.12 nm; a fourth layer of Rb has a thickness of 27.15 nm; a fifth layer of $H_4$ has a thickness of 303.07 nm; a sixth layer of Rb has a thickness of 54.95 nm; a seventh layer of $H_4$ has a thickness of 73.84 nm; an eighth layer of Rb has a thickness of 26.03 nm; a ninth layer of $H_4$ has a thickness of 68.18 nm; a tenth layer of Rb has a thickness of 70.15 nm; an eleventh layer of $H_4$ has a thickness of 177.34 nm; a twelfth layer of Rb has a thickness of 70.11 nm; a thirteenth layer of $H_4$ has a thickness of 49.72 nm; a fourteenth layer of Rb has a thickness of 64.2 nm; and a fifteenth layer of $H_4$ has a thickness of 153.5 nm.

Figure 5:
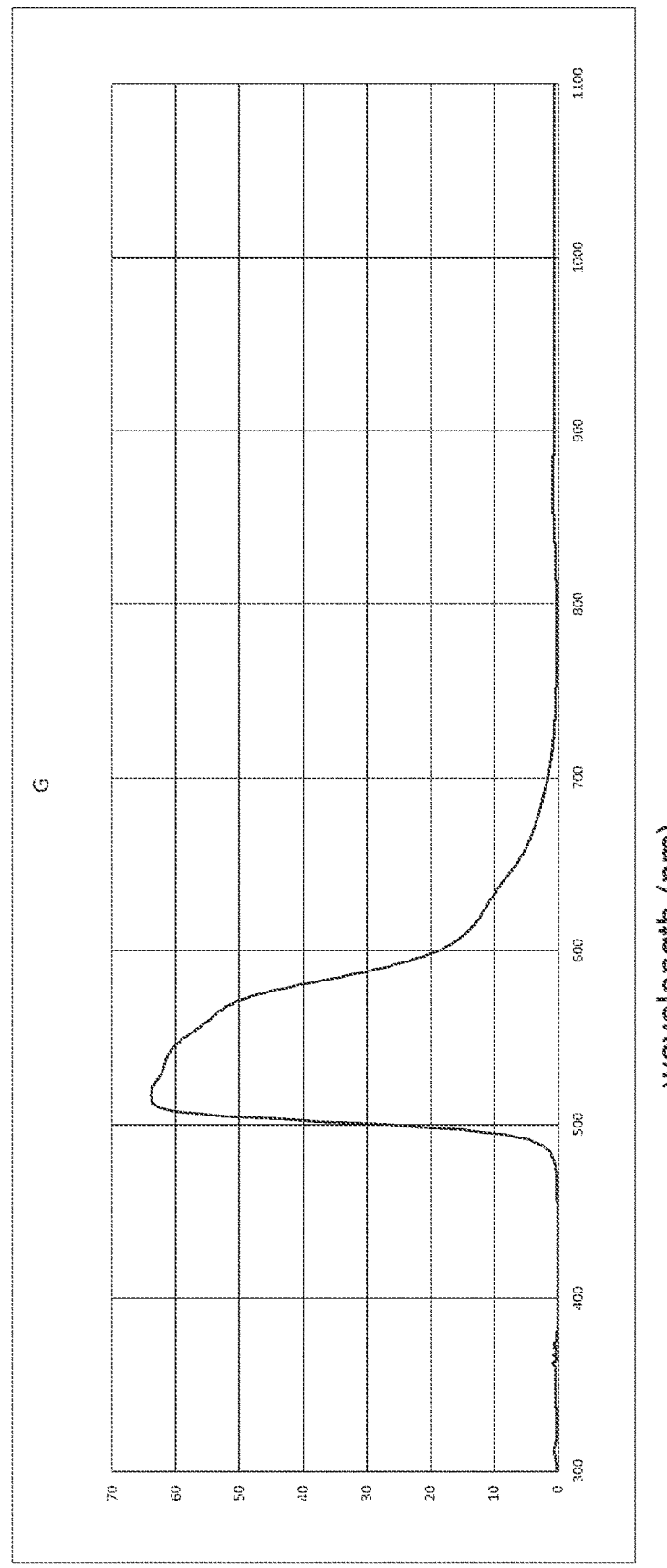
FIG. 5 is a spectrum diagram of a G pixel filter film of the present invention.

As shown in FIG. 5, the G pixel filter film forms a passband in a wavelength range of 300 nm to 1100 nm, and the passband central wavelength is 500 nm to 565 nm, and transmittance of the remaining cut-off band is lower than 1%, and transmittance of the passband central wavelength is greater than 55% at an incident angle of 0°.

B pixel filter film: the B pixel filter film is formed by alternately stacking a plurality of rubidium (Rb) layers 23 and high refractive index layers 24, wherein the high refractive index layers 24 can be respectively any one of titanium pentoxide ($Ti_3O_5$), titanium dioxide ($TiO_2$), niobium pentoxide ($Nb_2O_5$), tantalum pentoxide ($Ta_2O_5$), and a mixture film material ($H_4$), and as an example, the titanium pentoxide ($Ti_3O_5$) layers have a refractive index greater than 1.6 and extinction coefficient close to 0 in a wavelength range of 350 nm to 1100 nm. The rubidium (Rb) layers have a refractive index of 0.25 to 0.13 and extinction coefficient of 0.24 to 5.58 in a wavelength range of 350 nm to 2000 nm. The structural conditions are as follows:

A first layer of $Ti_3O_5$ has a thickness of 225.86 nm; a second layer of Rb has a thickness of 12.2 nm; a third layer of $Ti_3O_5$ has a thickness of 180.94 nm; a fourth layer of Rb has a thickness of 65.2 nm; a fifth layer of $Ti_3O_5$ has a thickness of 179.28 nm; a sixth layer of Rb has a thickness of 88.85 nm; a seventh layer of $Ti_3O_5$ has a thickness of 52.08 nm; an eighth layer of Rb has a thickness of 66.94 nm; a ninth layer of $Ti_3O_5$ has a thickness of 148.89 nm; a tenth layer of Rb has a thickness of 9.67 nm; an eleventh layer of $Ti_3O_5$ has a thickness of 62.89 nm; a twelfth layer of Rb has a thickness of 24.8 nm; and a thirteenth layer of $Ti_3O_5$ has a thickness of 48.76 nm;

or, a first layer of $TiO_2$ has a thickness of 226.4 nm; a second layer of Rb has a thickness of 12.2 nm; a third layer of $TiO_2$ has a thickness of 181.37 nm; a fourth layer of Rb has a thickness of 65.2 nm; a fifth layer of $TiO_2$ has a thickness of 179.71 nm; a sixth layer of Rb has a thickness of 88.85 nm; a seventh layer of $TiO_2$ has a thickness of 52.2 nm; an eighth layer of Rb has a thickness of 66.94 nm; a ninth layer of $TiO_2$ has a thickness of 149.24 nm; a tenth layer of Rb has a thickness of 9.76 nm; an eleventh layer of $TiO_2$ has a thickness of 63.04 nm; a twelfth layer of Rb has a thickness of 24.8 nm; and a thirteenth layer of $TiO_2$ has a thickness of 48.87 nm;

or, a first layer of $Nb_2O_5$ has a thickness of 228.19 nm; a second layer of Rb has a thickness of 12.2 nm; a third layer of $Nb_2O_5$ has a thickness of 182.8 nm; a fourth layer of Rb has a thickness of 65.2 nm; a fifth layer of $Nb_2O_5$ has a thickness of 181.13 nm; a sixth layer of Rb has a thickness of 88.85 nm; a seventh layer of $Nb_2O_5$ has a thickness of 52.62 nm; an eighth layer of Rb has a thickness of 66.94 nm; a ninth layer of $Nb_2O_5$ has a thickness of 150.42 nm; a tenth layer of Rb has a thickness of 9.67 nm; an eleventh layer of $Nb_2O_5$ has a thickness of 63.54 nm; a twelfth layer of Rb has a thickness of 24.8 nm; and a thirteenth layer of $Nb_2O_5$ has a thickness of 49.26 nm;

or, a first layer of $Ta_2O_5$-5# has a thickness of 244.83 nm; a second layer of Rb has a thickness of 12.2 nm; a third layer of $Ta_2O_5$-5# has a thickness of 196.14 nm; a fourth layer of Rb has a thickness of 65.25 nm; a fifth layer of $Ta_2O_5$-5# has a thickness of 194.34 nm; a sixth layer of Rb has a thickness of 88.85 nm; a seventh layer of $Ta_2O_5$-5# has a thickness of 56.45 nm; an eighth layer of Rb has a thickness of 66.94 nm; a ninth layer of $Ta_2O_5$-5# has a thickness of 161.39 nm; a tenth layer of Rb has a thickness of 9.76 nm; an eleventh layer of $Ta_2O_5$-5# has a thickness of 68.17 nm; a twelfth layer of Rb has a thickness of 24.8 nm; and a thirteenth layer of $Ta_2O_5$-5# has a thickness of 52.85 nm;

or, a first layer of $H_4$ has a thickness of 249.19 nm; a second layer of Rb has a thickness of 12.2 nm; a third layer of $H_4$ has a thickness of 199.63 nm; a fourth layer of Rb has a thickness of 65.2 nm; a fifth layer of $H_4$ has a thickness of 197.8 nm; a sixth layer of Rb has a thickness of 88.85 nm; a seventh layer of $H_4$ has a thickness of 57.46 nm; an eighth layer of Rb has a thickness of 66.94 nm; a ninth layer of $H_4$ has a thickness of 164.26 nm; a tenth layer of Rb has a thickness of 9.76 nm; an eleventh layer of $H_4$ has a thickness of 69.39 nm; a twelfth layer of Rb has a thickness of 24.8 nm; and a thirteenth layer of $H_4$ has a thickness of 53.79 nm.

Figure 6:
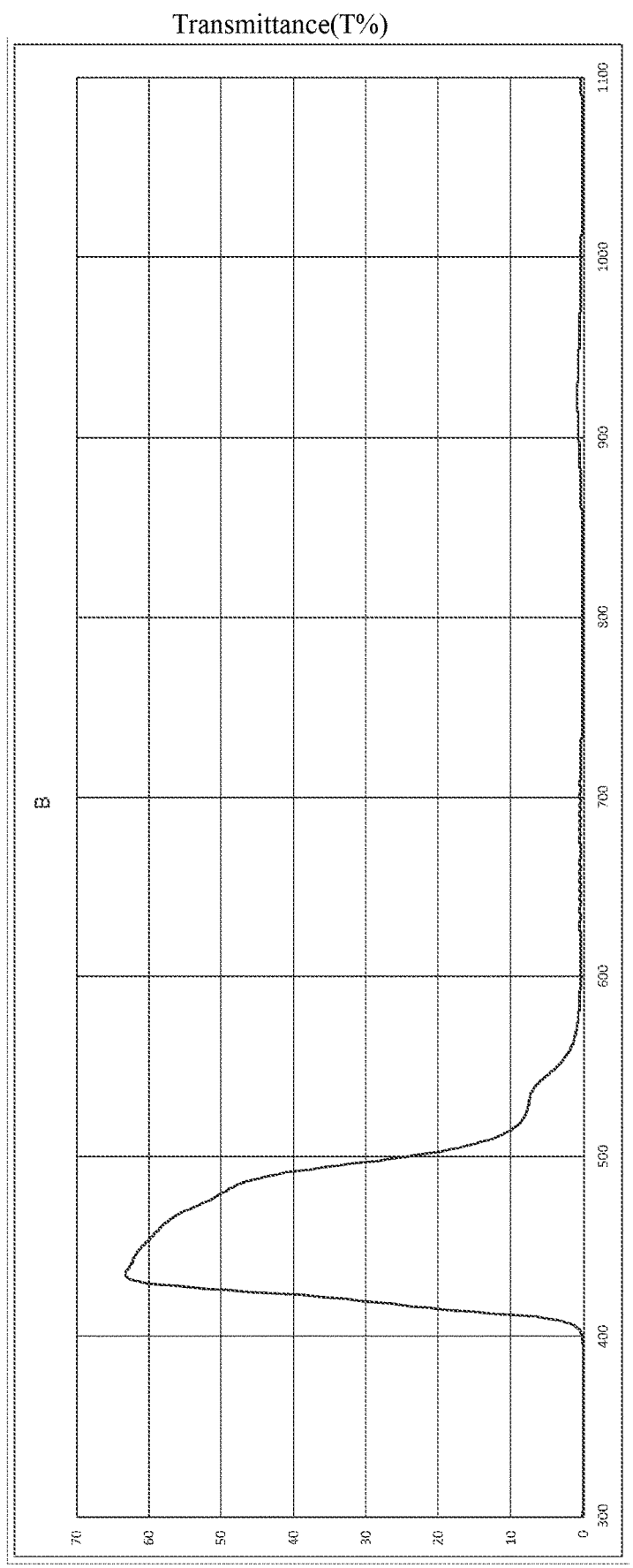
FIG. 6 is a spectrum diagram of a B pixel filter film of the present invention.

As shown in FIG. 6, the B pixel filter film forms a passband in a wavelength range of 300 nm to 1100 nm, and the passband central wavelength is 400 nm to 500 nm, and transmittance of the remaining cut-off band is lower than 1%, and transmittance of the passband central wavelength is greater than 55% at an incident angle of 0°.

IR pixel filter film: the IR pixel filter film is formed by alternately stacking a plurality of rubidium (Rb) layers 23 and high refractive index layers 24, wherein the plurality of high refractive index layers 24 can be respectively any one of titanium pentoxide ($Ti_3O_5$), titanium dioxide ($TiO_2$), niobium pentoxide ($Nb_2O_5$), tantalum pentoxide ($Ta_2O_5$), and a mixture film material ($H_4$), and as an example, the titanium pentoxide ($Ti_3O_5$) layers have a refractive index greater than 1.6 and extinction coefficient close to 0 in a wavelength range of 350 nm to 1100 nm. The rubidium (Rb) layers have a refractive index of 0.25 to 0.13 and extinction coefficient of 0.24 to 5.58 in a wavelength range of 350 nm to 2000 nm. The structural conditions are as follows:

A first layer of $Ti_3O_5$ has a thickness of 79.94 nm; a second layer of Rb has a thickness of 55.92 nm; a third layer of $Ti_3O_5$ has a thickness of 556.74 nm; a fourth layer of Rb has a thickness of 19.13 nm; a fifth layer of $Ti_3O_5$ has a thickness of 169.04 nm; a sixth layer of Rb has a thickness of 80.55 nm; a seventh layer of $Ti_3O_5$ has a thickness of 139.86 nm; an eighth layer of Rb has a thickness of 36.53 nm; a ninth layer of $Ti_3O_5$ has a thickness of 350.46 nm; a tenth layer of Rb has a thickness of 109.85 nm; an eleventh layer of $Ti_3O_5$ has a thickness of 122.52 nm; a twelfth layer of Rb has a thickness of 35.63 nm; a thirteenth layer of $Ti_3O_5$ has a thickness of 171.98 nm; a fourteenth layer of Rb has a thickness of 63.02 nm; and a fifteenth layer of $Ti_3O_5$ has a thickness of 263.23 nm;

or, a first layer of $TiO_2$ has a thickness of 78.76 nm; a second layer of Rb has a thickness of 55.92 nm; a third layer of $TiO_2$ has a thickness of 548.52 nm; a fourth layer of Rb has a thickness of 19.13 nm; a fifth layer of $TiO_2$ has a thickness of 166.54 nm; a sixth layer of Rb has a thickness of 80.55 nm; a seventh layer of $TiO_2$ has a thickness of 137.8 nm; an eighth layer of Rb has a thickness of 36.53 nm; a ninth layer of $TiO_2$ has a thickness of 345.29 nm; a tenth layer of Rb has a thickness of 109.85 nm; an eleventh layer of $TiO_2$ has a thickness of 120.71 nm; a twelfth layer of Rb has a thickness of 35.63 nm; a thirteenth layer of $TiO_2$ has a thickness of 169.44 nm; a fourteenth layer of Rb has a thickness of 63.02 nm; and a fifteenth layer of $TiO_2$ has a thickness of 262.83 nm;

or, a first layer of $Ta_2O_5$-5# has a thickness of 87.03 nm; a second layer of Rb has a thickness of 55.92 nm; a third layer of $Ta_2O_5$-5# has a thickness of 606.16 nm;

a fourth layer of Rb has a thickness of 19.13 nm; a fifth layer of $Ta_2O_5$-5# has a thickness of 184.04 nm; a sixth layer of Rb has a thickness of 80.55 nm; a seventh layer of $Ta_2O_5$-5# has a thickness of 152.28 nm; an eighth layer of Rb has a thickness of 36.53 nm; a ninth layer of $Ta_2O_5$-5# has a thickness of 381.57 nm; a tenth layer of Rb has a thickness of 109.85 nm; an eleventh layer of $Ta_2O_5$-5# has a thickness of 133.4 nm; a twelfth layer of Rb has a thickness of 35.63 nm; a thirteenth layer of $Ta_2O_5$-5# has a thickness of 187.25 nm; a fourteenth layer of Rb has a thickness of 63.02 nm; and a fifteenth layer of $Ta_2O_5$-5# has a thickness of 286.6 nm;

or, a first layer of $H_4$ has a thickness of 87.04 nm; a second layer of Rb has a thickness of 55.92 nm; a third layer of $H_4$ has a thickness of 606.22 nm; a fourth layer of Rb has a thickness of 19.13 nm; a fifth layer of $H_4$ has a thickness of 184.06 nm; a sixth layer of Rb has a thickness of 80.55 nm; a seventh layer of $H_4$ has a thickness of 152.29 nm; an eighth layer of Rb has a thickness of 36.53 nm; a ninth layer of $H_4$ has a thickness of 381.61 nm; a tenth layer of Rb has a thickness of 109.85 nm; an eleventh layer of $H_4$ has a thickness of 133.41 nm; a twelfth layer of Rb has a thickness of 35.63 nm; a thirteenth layer of $H_4$ has a thickness of 187.26 nm; a fourteenth layer of Rb has a thickness of 63.02 nm; and a fifteenth layer of $H_4$ has a thickness of 286.62 nm.

Figure 7:
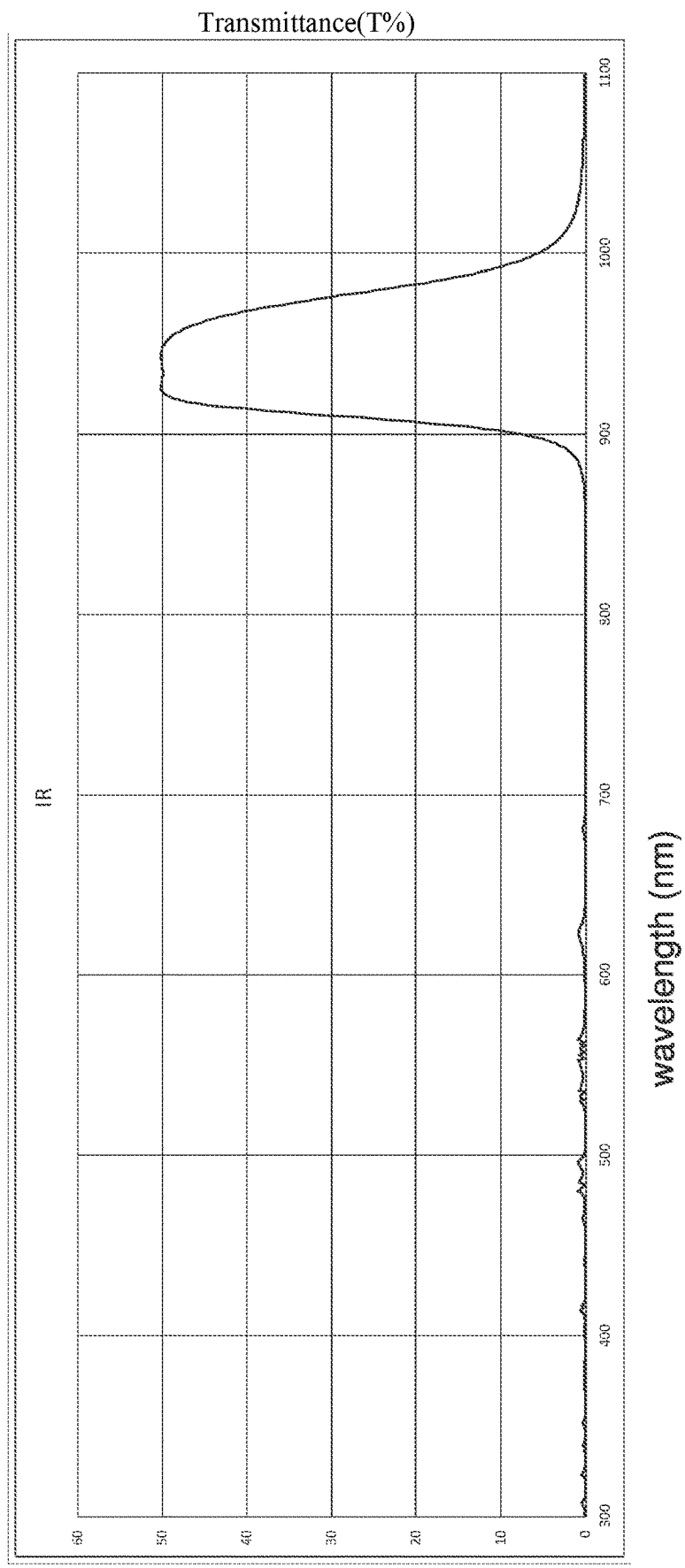
FIG. 7 is a spectrum diagram of an IR pixel filter film of the present invention.
Figure 8:
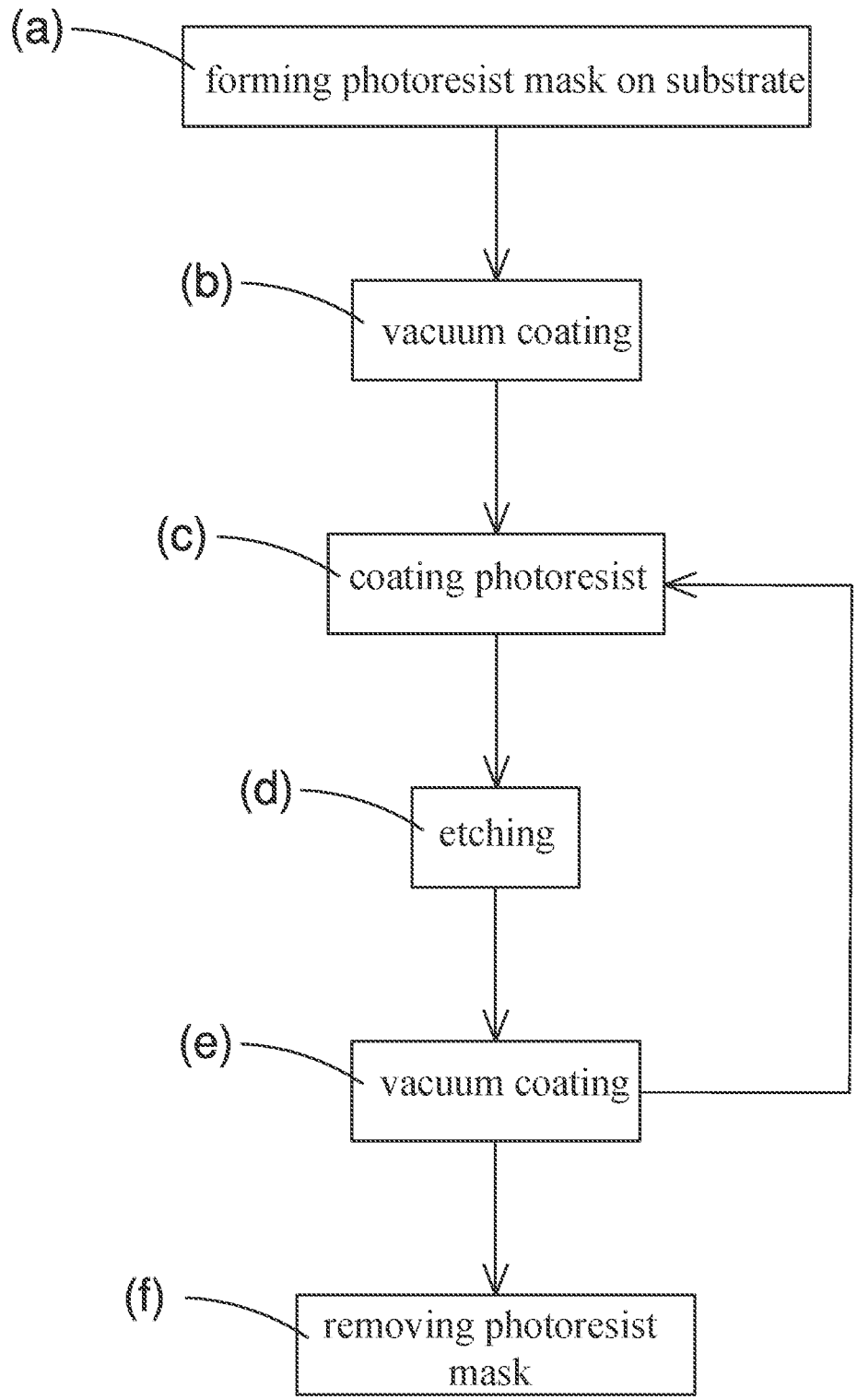
FIG. 8 is a flow chart illustrating a manufacturing method according to the present invention.
Figure 9:
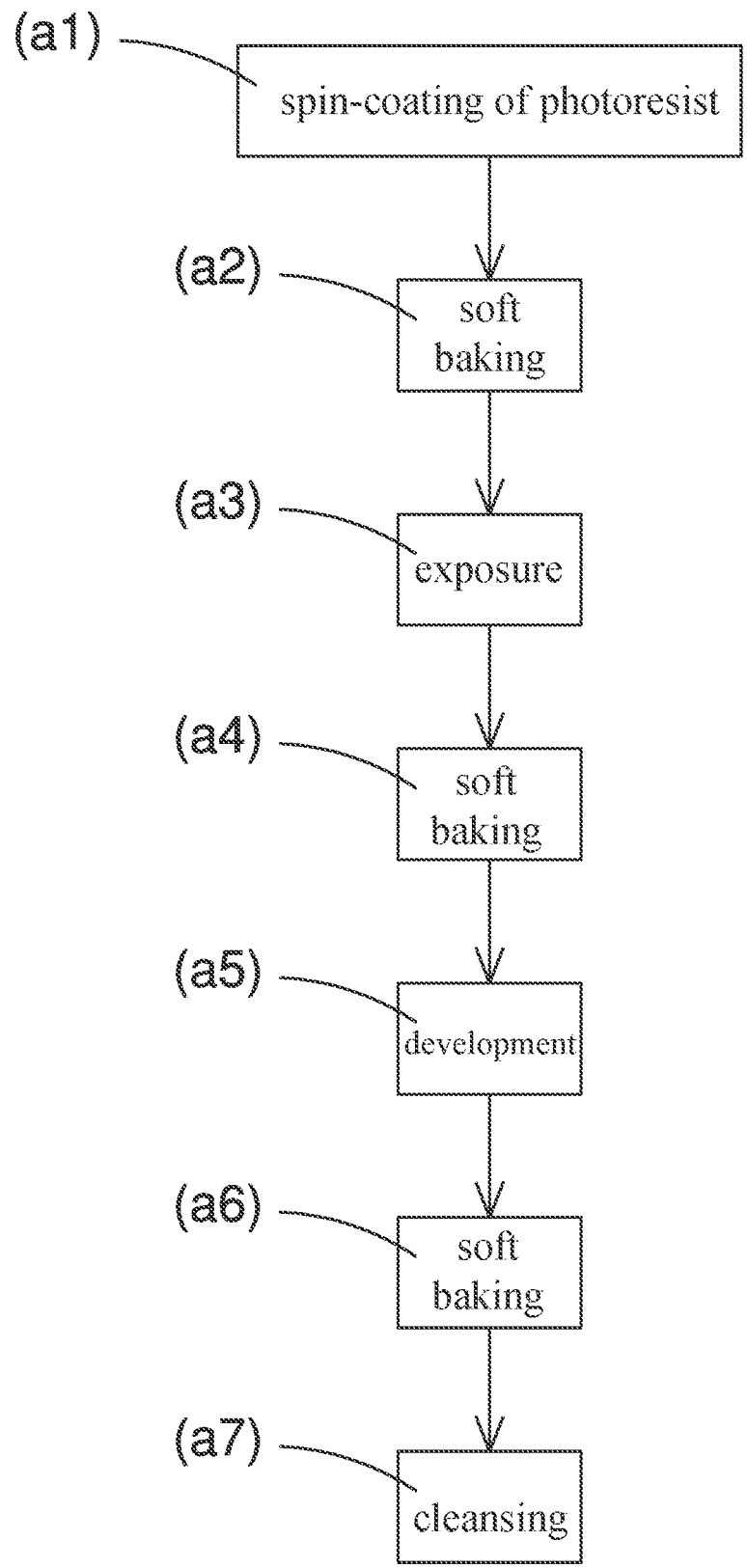
FIG. 9 is a flow chart illustrating photoresist masking according to the present invention.
Figure 10:
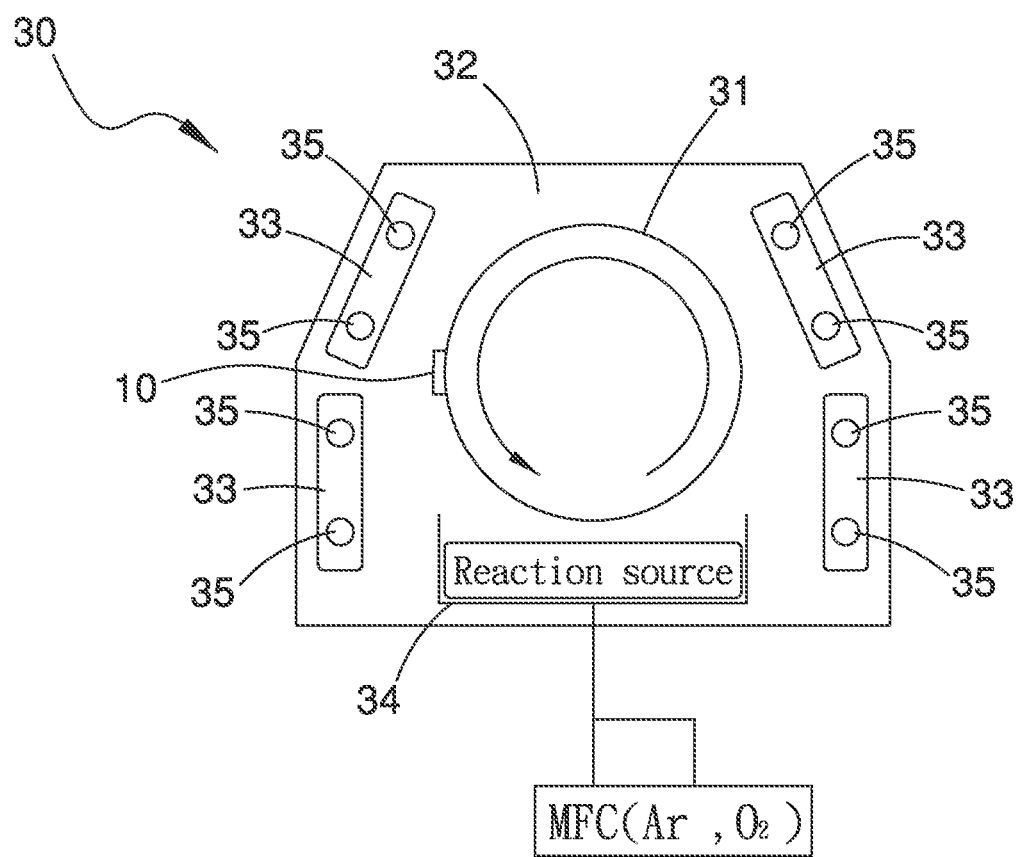
FIG. 10 is a schematic structure view showing a reactive vacuum sputtering coating system according to the present invention.

As shown in FIG. 7, the IR pixel filter film forms a passband in a wavelength range of 300 nm to 1100 nm, and the central wavelength in a wavelength range of infrared 800 nm to 1100 nm only has a portion or partly overlapped to form a passband, and transmittance of the remaining cut-off band is lower than 1%, and transmittance of the passband central wavelength is greater than 30% at an incident angle of 0°.

Referring to FIG. 7, a method for manufacturing an optical filter structure of an arbitrary combination of UV, R, G, B, and IR according to the present invention is shown, comprising the following steps:

(a) forming photoresist mask on substrate 10: forming a photoresist mask on a surface of a substrate 10, such that a plurality of film-coating zones, which are hollowed, are formed in portions of the photoresist mask in which pixel filter films 22 are to be coated, such as forming such a plurality of film-coating zones in a hollowed form in a region where an R pixel filter film is to be coated;

(b) vacuum coating: performing an operation of vacuum coating to form, in the film-coating zones, a plurality of pixel filter films 22, such as R pixel filter films, which are formed by alternately stacking a plurality of rubidium (Rb) layers 23 and a plurality of high refractive index layers 24, which are of different thicknesses;

(c) coating photoresist: coating photoresist on the hollowed film-coating zones that have been coated with the pixel filter films, in order to seal the hollowed film-coating zones;

(d) etching: performing an operation of etching to form a plurality of additional hollowed film-coating zones, in which a plurality of additional pixel filter films 22 are to be coated, in portions of the photoresist mask, such as forming such a plurality of additional film-coating zones in a hollowed form in a region where a G pixel filter film is to be coated;

(e) vacuum coating again: performing an operation of vacuum coating to form, in the plurality of additional film-coating zones formed through the operation of etching, a plurality of additional pixel filter films 22, such as G pixel filter films, which are formed by alternately stacking a plurality of rubidium (Rb) layers 23 and a plurality of high refractive index layers 24, which are of different thicknesses, wherein steps (c)-(e) are selectively repeated to make an optical filter structure that is formed of three or multiple pixel filter films; and (f) removing photoresist mask: removing the photoresist mask to complete the process.

Referring to FIG. 6, step (a) includes sub-steps of (a1) spin-coating of photoresist; (a2) soft baking; (a3) exposure; (a4) soft baking; (a5) development; (a6) soft baking; and (a7) cleansing.

Referring to FIG. 7, the vacuum coating operations of step (b) and step (e) are performed in a reactive vacuum sputtering coating system 30, in which rubidium (Rb) and a high refractive index material having a refractive index higher than that of rubidium (Rb), such as oxides including titanium pentoxide ($Ti_3O_5$), titanium dioxide ($TiO_2$), niobium pentoxide ($Nb_2O_5$), tantalum pentoxide ($Ta_2O_5$), and a mixture film material ($H_4$), and a mixture thereof, are used as target materials 35 for sputtering, and a process of the operations includes (A) placing a clean substrate 10 on a roller 31, such that a film coating side faces outwards; (B) making the roller 31 rotating in a film coating chamber 32 at a constant speed; (C) activating a corresponding sputtering source 33 and introducing argon when vacuum reaches 10-3 Pa to 10-5 Pa, such that under an electric field, the target materials 35 are bombarded to form ions that attach to the substrate 10; (D) allowing the substrate 10 to be brought, with the rotation of the roller 31, toward a reaction source zone 34; and (E) supplying oxygen or argon to the reaction source zone 34 to form plasma, which, under an electric field, moves at a high speed toward the substrate 10 to eventually form rubidium (Rb) or the high refractive index material on the substrate 10.

The substrate 10 is arranged on the roller 31 and is rotated with the roller 31 in a counterclockwise direction, the rotating speed being adjustable. The substrate 10 that is to be coated with a film is first passing through the target materials 35 to receive an extremely thin rubidium (Rb) layer or high refractive index film to deposited thereon, and is then rotated to reach the reaction source to be synthesized, by means of ions including oxygen ions and electrons, to form an optical film of desired characteristics. The thickness of each layer of coating can be controlled by controlling the number of seconds that is taken for coating the film, and the longer the time, the greater the thickness.

In the forming of the rubidium (Rb) film, the introduced oxygen takes a volume percentage of 10% to 90% of a sum of oxygen and argon so introduced and this allows making of a film having a refractive index of 0.25 to 0.13 and an extinction coefficient of 0.24 to 5.58 in a wavelength range of 350 nm to 2000 nm. When the high refractive index material is applied, the introduced oxygen takes a volume percentage of 10% to 90% of a sum of oxygen and argon so introduced, and this allows making of a high refractive index film having a refractive index varying from 1.3 to 2.5 in 350 nm to 1100 nm and an extinction coefficient close to 0.

The present invention provides an optical filter structure of an arbitrary combination of UV, R, G, B, and IR, and a manufacturing method thereof, which applies a process of vacuum coating in combination with photoresist masking, so that even it is applied to manufacturing a large-sized substrate, uniformity can reach a level of being below ±5 nm, satisfying optical specification requirement. Further, when it is applied to a sensor chip of an optical sensor, such as an ambient light sensor (ALS), a proximity sensor (PS), a RGB color temperature sensor, and a hand gesture sensor, the response time is faster and the color recognizability and adjustment sensitivity are significantly improved as compared to known products of the kind, and brightness rendering for light sensitivity and contrast can be greatly enhanced. Further, the manufacturing method of the present invention is such that the pixel filter films 22 of UV, R, G, B, and IR are set to have a thickness of a nanometer order, so that it is applicable to scientific and technical products of nanometer fabrication technology.

We claim:

1. An optical filter structure of arbitrary combination of ultraviolet (UV), red (R), green (G), blue (B), and infrared (IR), comprising:
    a substrate, which is one of a wafer semiconductor sensor device and a product of a light-transmitting device; and
    a filter layer, which is formed on a surface of the substrate and is formed of a plurality of basic units arranged in an array, wherein each of the basic units comprises a plurality of pixel filter films formed through vacuum coating, and the plurality of pixel filter films comprise an arbitrary combination of a ultraviolet (UV) pixel filter film, a red (R) pixel filter film, a green (G) pixel filter film, a blue (B) pixel filter film, and an infrared (IR) pixel filter film, such that the plurality of pixel filter films allow light of corresponding wavelengths to pass therethrough;
    wherein:
    the UV pixel filter film is formed by alternately stacking a plurality of rubidium (Rb) layers and a plurality of high refractive index layers having refractive indexes higher than the rubidium (Rb) layers, wherein each of the layers has a unique arrangement of thickness to form a passband in a wavelength range of 300 nm to 1100 nm, the passband having a central wavelength of 300 nm to 400 nm, and remaining being cut off, the passband central wavelength having transmittance greater than 50% at an incident angle of 0°, a cut-off band having transmittance averagely lower than 1%;
    the R pixel filter film is formed by alternately stacking a plurality of rubidium (Rb) layers and a plurality of high refractive index layers having refractive indexes higher than the rubidium (Rb) layers, wherein each of the layers has a unique arrangement of thickness to form a passband in a wavelength range of 300 nm to 1100 nm, the passband having a central wavelength of 580 nm to 740 nm, and remaining being cut off, the passband central wavelength having transmittance greater than 55% at an incident angle of 0°, the cut-off band having transmittance lower than 1%;
    the G pixel filter film is formed by alternately stacking a plurality of rubidium (Rb) layers and a plurality of high refractive index layers having refractive indexes higher than the rubidium (Rb) layers, wherein each of the layers has a unique arrangement of thickness to form a passband in a wavelength range of 300 nm to 1100 nm, the passband having a central wavelength of 500 nm to 565 nm, and remaining being cut off, the passband central wavelength having transmittance greater than 55% at an incident angle of 0°, the cut-off band having transmittance lower than 1%;
    the B pixel filter film is formed by alternately stacking a plurality of rubidium (Rb) layers and a plurality of high refractive index layers having refractive indexes higher than the rubidium (Rb) layers, wherein each of the layers has a unique arrangement of thickness to form a passband in a wavelength range of 300 nm to 1100 nm, the passband having a central wavelength of 400 nm to 500 nm, and remaining being cut off, the passband central wavelength having transmittance greater than 55% at an incident angle of 0°, the cut-off band having transmittance lower than 1%; and
    the IR pixel filter film is formed by alternately stacking a plurality of rubidium (Rb) layers and a plurality of high refractive index layers having refractive indexes higher than the rubidium (Rb) layers, so as to form a passband in a wavelength range of 300 nm to 1100 nm, the central wavelength in a wavelength range of infrared 800 nm to 1100 nm only having a portion or partly overlapped to form a passband, remaining being a cut-off band having transmittance lower than 1%, transmittance of the passband central wavelength being greater than 30% at an incident angle of 0°.

2. The optical filter structure of arbitrary combination of UV, R, G, B, and IR according to claim 1, wherein the plurality of rubidium (Rb) layers of the plurality of pixel filter films have refractive indexes of 0.25 to 0.13 and extinction coefficients of 0.24 to 5.58 in a wavelength range of 350 nm to 2000 nm; and wherein the plurality of high refractive index layers are selected from the group consisting of titanium pentoxide ($Ti_3O_5$), titanium dioxide ($TiO_2$), niobium pentoxide ($Nb_2O_5$), tantalum pentoxide ($Ta_2O_5$), a mixture film material ($H_4$), and mixtures thereof, and the plurality of high refractive index layers have refractive indexes greater than 1.6 and extinction coefficients close to 0 in a wavelength range of 350 nm to 1100 nm.

3. The optical filter structure of arbitrary combination of UV, R, G, B, and IR according to claim 2, wherein structural condition of the UV pixel filter film is one of the following:
    a first layer of $Ti_3O_5$ having a thickness of 82.56 nm; a second layer of Rb having a thickness of 42.79 nm; a third layer of $Ti_3O_5$ having a thickness of 18.36 nm; a fourth layer of Rb having a thickness of 61.82 nm; a fifth layer of $Ti_3O_5$ having a thickness of 92.26 nm; a sixth layer of Rb having a thickness of 44.13 nm; a seventh layer of $Ti_3O_5$ having a thickness of 26.52 nm; an eighth layer of Rb having a thickness of 54.26 nm; a ninth layer of $Ti_3O_5$ having a thickness of 29.99 nm; a tenth layer of Rb having a thickness of 29.32 nm; an eleventh layer of $Ti_3O_5$ having a thickness of 30.24 nm; a twelfth layer of Rb having a thickness of 55.54 nm; a thirteenth layer of $Ti_3O_5$ having a thickness of 154.53 nm; a fourteenth layer of Rb having a thickness of 61.42 nm; a fifteenth layer of $Ti_3O_5$ having a thickness of 83.48 nm; a sixteenth layer of Rb having a thickness of 60.76 nm; and a seventeenth layer of $Ti_3O_5$ having a thickness of 76.12 nm;
    or, a first layer of $TiO_2$ having a thickness of 82.87 nm 82.87 nm; a second layer of Rb having a thickness of 42.79 nm 42.79 nm; a third layer of $TiO_2$ having a thickness of 18.39 nm; a fourth layer of Rb having a thickness of 61.82 nm; a fifth layer of $TiO_2$ having a thickness of 92.44 nm; a sixth layer of Rb having a thickness of 44.13 nm; a seventh layer of $TiO_2$ having a thickness of 26.57 nm; an eighth layer of Rb having a thickness of 54.26 nm; a ninth layer of $TiO_2$ having a thickness of 30.05 nm; a tenth layer of Rb having a thickness of 29.32 nm; an eleventh layer of $TiO_2$ having a thickness of 30.3 nm; a twelfth layer of Rb having a thickness of 55.54 nm; a thirteenth layer of $TiO_2$ having a thickness of 154.83 nm; a fourteenth layer of Rb having a thickness of 61.42 nm; a fifteenth layer of TiO$_2$ having a thickness of 83.64 nm; a sixteenth layer of Rb having a thickness of 60.76 nm; and a seventeenth layer material of TiO$_2$ having a thickness of 76.27 nm;

or, a first layer of Nb$_2$O$_5$ having a thickness of 85.46 nm; a second layer of Rb having a thickness of 42.79 nm; a third layer of Nb$_2$O$_5$ having a thickness of 19 nm; a fourth layer of Rb having a thickness of 61.82 nm; a fifth layer of Nb$_2$O$_5$ having a thickness of 95.5 nm; a sixth layer of Rb having a thickness of 44.13 nm; a seventh layer of Nb$_2$O$_5$ having a thickness of 44.13 nm; an eighth layer of Rb having a thickness of 54.26 nm; a ninth layer of Nb$_2$O$_5$ having a thickness of 31.05 nm; a tenth layer of Rb having a thickness of 29.32 nm; an eleventh layer of Nb$_2$O$_5$ having a thickness of 31.3 nm; a twelfth layer of Rb having a thickness of 55.54 nm; a thirteenth layer of Nb$_2$O$_5$ having a thickness of 159.96 nm; a fourteenth layer of Rb having a thickness of 61.42 nm; a fifteenth layer of Nb$_2$O$_5$ having a thickness of 86.41 nm; a sixteenth layer of Rb having a thickness of 60.76 nm; and a seventeenth layer material of Nb$_2$O$_5$ having a thickness of 78.8 nm;

or, a first layer of Ta$_2$O$_5$ having a thickness of 93.58 nm; a second layer of Rb having a thickness of 42.79 nm; a third layer of Ta$_2$O$_5$ having a thickness of 20.81 nm; a fourth layer of Rb having a thickness of 61.82 nm; a fifth layer of Ta$_2$O$_5$ having a thickness of 104.58 nm; a sixth layer of Rb having a thickness of 44.13 nm; a seventh layer of Ta$_2$O$_5$ having a thickness of 30.06 nm; an eighth layer of Rb having a thickness of 54.26 nm; a ninth layer of Ta$_2$O$_5$ having a thickness of 34 nm; a tenth layer of Rb having a thickness of 29.32 nm; an eleventh layer of Ta$_2$O$_5$ having a thickness of 34.28 nm; a twelfth layer of Rb having a thickness of 55.54 nm; a thirteenth layer of Ta$_2$O$_5$ having a thickness of 175.16 nm; a fourteenth layer of Rb having a thickness of 61.42 nm; a fifteenth layer of Ta$_2$O$_5$ having a thickness of 94.62 nm; a sixteenth layer of Rb having a thickness of 60.76 nm; and a seventeenth layer material of Ta$_2$O$_5$ having a thickness of 86.29 nm;

or, a first layer of H$_4$ having a thickness of 95.57 nm; a second layer of Rb having a thickness of 42.79 nm; a third layer of H$_4$ having a thickness of 21.25 nm; a fourth layer of Rb having a thickness of 61.82 nm; a fifth layer of H$_4$ having a thickness of 106.8 nm; a sixth layer of Rb having a thickness of 44.13 nm; a seventh layer of H$_4$ having a thickness of 30.7 nm; an eighth layer of Rb having a thickness of 54.26 nm; a ninth layer of H$_4$ having a thickness of 34.72 nm; a tenth layer of Rb having a thickness of 29.32 nm; an eleventh layer of H$_4$ having a thickness of 35.01 nm; a twelfth layer of Rb having a thickness of 55.54 nm; a thirteenth layer of H$_4$ having a thickness of 178.89 nm; a fourteenth layer of Rb having a thickness of 61.42 nm; a fifteenth layer of H$_4$ having a thickness of 96.64 nm; a sixteenth layer of Rb having a thickness of 60.76 nm; and a seventeenth layer material of H$_4$ having a thickness of 88.12 nm.

4. The optical filter structure of arbitrary combination of UV, R, G, B, and IR according to claim 3, wherein structural condition of the R pixel filter film is one of the following:

a first layer of Ti$_3$O$_5$ having a thickness of 66.02 nm; a second layer of Rb having a thickness of 7.96 nm; a third layer of Ti$_3$O$_5$ having a thickness of 128.05 nm; a fourth layer of Rb having a thickness of 52.37 nm; a fifth layer of Ti$_3$O$_5$ having a thickness of 120.7 nm; a sixth layer of Rb having a thickness of 61.05 nm; a seventh layer of Ti$_3$O$_5$ having a thickness of 123.81 nm; an eighth layer of Rb having a thickness of 59.29 nm; a ninth layer of Ti$_3$O$_5$ having a thickness of 34.09 nm; a tenth layer of Rb having a thickness of 61.6 nm; an eleventh layer of Ti$_3$O$_5$ having a thickness of 37.04 nm; a twelfth layer of Rb having a thickness of 55.14 nm; a thirteenth layer of Ti$_3$O$_5$ having a thickness of 35.34 nm; a fourteenth layer of Rb having a thickness of 53.51 nm; and a fifteenth layer of Ti$_3$O$_5$ having a thickness of 107.1 nm;

or, a first layer of TiO$_2$ having a thickness of 66.35 nm; a second layer of Rb having a thickness of 7.96 nm; a third layer of TiO$_2$ having a thickness of 128.69 nm; a fourth layer of Rb having a thickness of 52.37 nm; a fifth layer of TiO$_2$ having a thickness of 121.3 nm; a sixth layer of Rb having a thickness of 61.05 nm; a seventh layer of TiO$_2$ having a thickness of 124.42 nm; an eighth layer of Rb having a thickness of 59.29 nm; a ninth layer of TiO$_2$ having a thickness of 34.26 nm; a tenth layer of Rb having a thickness of 61.6 nm; an eleventh layer of TiO$_2$ having a thickness of 37.23 nm; a twelfth layer of Rb having a thickness of 54.14 nm; a thirteenth layer of TiO$_2$ having a thickness of 35.52 nm; a fourteenth layer of Rb having a thickness of 53.51 nm; and a fifteenth layer of TiO$_2$ having a thickness of 107.63 nm;

or, a first layer of Nb$_2$O$_5$ having a thickness of 67.27 nm; a second layer of Rb having a thickness of 7.96 nm; a third layer of Nb$_2$O$_5$ having a thickness of 130.47 nm; a fourth layer of Rb having a thickness of 52.37 nm; a fifth layer of Nb$_2$O$_5$ having a thickness of 122.98 nm; a sixth layer of Rb having a thickness of 61.05 nm; a seventh layer of Nb$_2$O$_5$ having a thickness of 126.15 nm; an eighth layer of Rb having a thickness of 59.29 nm; a ninth layer of Nb$_2$O$_5$ having a thickness of 34.73 nm; a tenth layer of Rb having a thickness of 61.1 nm; an eleventh layer of Nb$_2$O$_5$ having a thickness of 37.74 nm; a twelfth layer of Rb having a thickness of 54.14 nm; a thirteenth layer of Nb$_2$O$_5$ having a thickness of 36.01 nm; a fourteenth layer of Rb having a thickness of 53.51 nm; and a fifteenth layer of Nb$_2$O$_5$ having a thickness of 109.12 nm;

or, a first layer of Ta$_2$O$_5$ having a thickness of 73.07 nm; a second layer of Rb having a thickness of 7.96 nm; a third layer of Ta$_2$O$_5$ having a thickness of 141.72 nm; a fourth layer of Rb having a thickness of 52.37 nm; a fifth layer of Ta$_2$O$_5$ having a thickness of 133.58 nm; a sixth layer of Rb having a thickness of 61.05 nm; a seventh layer of Ta$_2$O$_5$ having a thickness of 137.02 nm; an eighth layer of Rb having a thickness of 59.29 nm; a ninth layer of Ta$_2$O$_5$ having a thickness of 37.73 nm; a tenth layer of Rb having a thickness of 61.6 nm; an eleventh layer of Ta$_2$O$_5$ having a thickness of 41 nm 41 nm; a twelfth layer of Rb having a thickness of 54.14 nm; a thirteenth layer of Ta$_2$O$_5$ having a thickness of 39.11 nm; a fourteenth layer of Rb having a thickness of 53.51 nm; and a fifteenth layer of Ta$_2$O$_5$ having a thickness of 118.53 nm;

or, a first layer of H$_4$ having a thickness of 75.04 nm; a second layer of Rb having a thickness of 7.96 nm; a third layer of H$_4$ having a thickness of 145.55 nm; a fourth layer of Rb having a thickness of 52.37 nm; a fifth layer of H$_4$ having a thickness of 137.19 nm; a sixth layer of Rb having a thickness of 61.05 nm; a seventh layer of H$_4$ having a thickness of 140.73 nm; an eighth layer of Rb having a thickness of 59.29 nm; a ninth layer of H₄ having a thickness of 38.75 nm; a tenth layer of Rb having a thickness of 61.6 nm; an eleventh layer of H₄ having a thickness of 42.1 nm; a twelfth layer of Rb having a thickness of 54.14 nm; a thirteenth layer of H₄ having a thickness of 40.17 nm; a fourteenth layer of Rb having a thickness of 53.51 nm; and a fifteenth layer of H₄ having a thickness of 121.73 nm.

5. The optical filter structure of arbitrary combination of UV, R, G, B, and IR according to claim 2, wherein structural condition of the G pixel filter film is one of the following:

a first layer of $Ti_3O_5$ having a thickness of 37.73 nm; a second layer of Rb having a thickness of 1.13 nm; a third layer of $Ti_3O_5$ having a thickness of 435.81 nm; a fourth layer of Rb having a thickness of 27.15 nm; a fifth layer of $Ti_3O_5$ having a thickness of 272.27 nm; a sixth layer of Rb having a thickness of 54.95 nm; a seventh layer of $Ti_3O_5$ having a thickness of 66.34 nm; an eighth layer of Rb having a thickness of 26.03 nm; a ninth layer of $Ti_3O_5$ having a thickness of 61.25 nm; a tenth layer of Rb having a thickness of 70.15 nm; an eleventh layer of $Ti_3O_5$ having a thickness of 159.31 nm; a twelfth layer of Rb having a thickness of 70.11 nm; a thirteenth layer of $Ti_3O_5$ having a thickness of 44.67 nm; a fourteenth layer of Rb having a thickness of 64.2 nm; and a fifteenth layer of $Ti_3O_5$ having a thickness of 137.9 nm;

or, a first layer of $TiO_2$ having a thickness of 37.73 nm; a second layer of Rb having a thickness of 1.13 nm; a third layer of $TiO_2$ having a thickness of 435.84 nm; a fourth layer of Rb having a thickness of 27.15 nm; a fifth layer of $TiO_2$ having a thickness of 272.28 nm; a sixth layer of Rb having a thickness of 54.95 nm; a seventh layer of $TiO_2$ having a thickness of 66.34 nm; an eighth layer of Rb having a thickness of 26.03 nm; a ninth layer of $TiO_2$ having a thickness of 61.25 nm; a tenth layer of Rb having a thickness of 70.15 nm; an eleventh layer of $TiO_2$ having a thickness of 159.32 nm; a twelfth layer of Rb having a thickness of 70.11 nm; a thirteenth layer of $TiO_2$ having a thickness of 44.67 nm; a fourteenth layer of Rb having a thickness of 64.2 nm; and a fifteenth layer of $TiO_2$ having a thickness of 137.9 nm;

or, a first layer of $Nb_2O_5$ having a thickness of 38.24 nm; a second layer of Rb having a thickness of 1.13 nm; a third layer of $Nb_2O_5$ having a thickness of 441.74 nm; a fourth layer of Rb having a thickness of 27.15 nm; a fifth layer of $Nb_2O_5$ having a thickness of 275.97 nm; a sixth layer of Rb having a thickness of 54.95 nm; a seventh layer of $Nb_2O_5$ having a thickness of 67.26 nm; an eighth layer of Rb having a thickness of 26.03 nm; a ninth layer of $Nb_2O_5$ having a thickness of 62.08 nm; a tenth layer of Rb having a thickness of 70.15 nm; an eleventh layer of $Nb_2O_5$ having a thickness of 161.48 nm; a twelfth layer of Rb having a thickness of 70.11 nm; a thirteenth layer of $Nb_2O_5$ having a thickness of 45.28 nm; a fourteenth layer of Rb having a thickness of 64.2 nm; and a fifteenth layer of $Nb_2O_5$ having a thickness of 139.77 nm;

or, a first layer of $Ta_2O_5$ having a thickness of 41.04 nm; a second layer of Rb having a thickness of 1.13 nm; a third layer of $Ta_2O_5$ having a thickness of 474.13 nm; a fourth layer of Rb having a thickness of 27.15 nm; a fifth layer of $Ta_2O_5$ having a thickness of 296.21 nm; a sixth layer of Rb having a thickness of 54.95 nm; a seventh layer of $Ta_2O_5$ having a thickness of 72.17 nm; an eighth layer of Rb having a thickness of 26.03 nm; a ninth layer of $Ta_2O_5$ having a thickness of 66.63 nm; a tenth layer of Rb having a thickness of 70.15 nm; an eleventh layer of $Ta_2O_5$ having a thickness of 173.32 nm; a twelfth layer of Rb having a thickness of 70.11 nm; a thirteenth layer of $Ta_2O_5$ having a thickness of 48.6 nm; a fourteenth layer of Rb having a thickness of 64.2 nm; and a fifteenth layer of $Ta_2O_5$ having a thickness of 150.02 nm;

or, a first layer of H₄ having a thickness of 41.99 nm; a second layer of Rb having a thickness of 1.13 nm; a third layer of H₄ having a thickness of 485.12 nm; a fourth layer of Rb having a thickness of 27.15 nm; a fifth layer of H₄ having a thickness of 303.07 nm; a sixth layer of Rb having a thickness of 54.95 nm; a seventh layer of H₄ having a thickness of 73.84 nm; an eighth layer of Rb having a thickness of 26.03 nm; a ninth layer of H₄ having a thickness of 68.18 nm; a tenth layer of Rb having a thickness of 70.15 nm; an eleventh layer of H₄ having a thickness of 177.34 nm; a twelfth layer of Rb having a thickness of 70.11 nm; a thirteenth layer of H₄ having a thickness of 49.72 nm; a fourteenth layer of Rb having a thickness of 64.2 nm; and a fifteenth layer of H₄ having a thickness of 153.5 nm.

6. The optical filter structure of arbitrary combination of UV, R, G, B, and IR according to claim 3, wherein structural condition of the B pixel filter film is one of the following:

a first layer of $Ti_3O_5$ having a thickness of 225.86 nm; a second layer of Rb having a thickness of 12.2 nm; a third layer of $Ti_3O_5$ having a thickness of 180.94 nm; a fourth layer of Rb having a thickness of 65.2 nm; a fifth layer of $Ti_3O_5$ having a thickness of 179.28 nm; a sixth layer of Rb having a thickness of 88.85 nm; a seventh layer of $Ti_3O_5$ having a thickness of 52.08 nm; an eighth layer of Rb having a thickness of 66.94 nm; a ninth layer of $Ti_3O_5$ having a thickness of 148.89 nm; a tenth layer of Rb having a thickness of 9.67 nm; an eleventh layer of $Ti_3O_5$ having a thickness of 62.89 nm; a twelfth layer of Rb having a thickness of 24.8 nm; and a thirteenth layer of $Ti_3O_5$ having a thickness of 48.76 nm;

or, a first layer of $TiO_2$ having a thickness of 226.4 nm; a second layer of Rb having a thickness of 12.2 nm; a third layer of $TiO_2$ having a thickness of 181.37 nm; a fourth layer of Rb having a thickness of 65.2 nm; a fifth layer of $TiO_2$ having a thickness of 179.71 nm; a sixth layer of Rb having a thickness of 88.85 nm; a seventh layer of $TiO_2$ having a thickness of 52.2 nm; an eighth layer of Rb having a thickness of 66.94 nm; a ninth layer of $TiO_2$ having a thickness of 149.24 nm; a tenth layer of Rb having a thickness of 9.76 nm 9.76 nm; an eleventh layer of $TiO_2$ having a thickness of 63.04 nm; a twelfth layer of Rb having a thickness of 24.8 nm; and a thirteenth layer of $TiO_2$ having a thickness of 48.87 nm;

or, a first layer of $Nb_2O_5$ having a thickness of 228.19 nm; a second layer of Rb having a thickness of 12.2 nm; a third layer of $Nb_2O_5$ having a thickness of 182.8 nm; a fourth layer of Rb having a thickness of 65.2 nm; a fifth layer of $Nb_2O_5$ having a thickness of 181.13 nm; a sixth layer of Rb having a thickness of 88.85 nm; a seventh layer of $Nb_2O_5$ having a thickness of 52.62 nm; an eighth layer of Rb having a thickness of 66.94 nm; a ninth layer of $Nb_2O_5$ having a thickness of 150.42 nm; a tenth layer of Rb having a thickness of 9.67 nm; an eleventh layer of $Nb_2O_5$ having a thickness of 63.54 nm; a twelfth layer of Rb having a thickness of 24.8 nm; and a thirteenth layer of Nb$_2$O$_5$ having a thickness of 49.26 nm;

or, a first layer of Ta$_2$O$_5$ having a thickness of 244.83 nm; a second layer of Rb having a thickness of 12.2 nm; a third layer of Ta$_2$O$_5$ having a thickness of 196.14 nm; a fourth layer of Rb having a thickness of 65.25 nm; a fifth layer of Ta$_2$O$_5$ having a thickness of 194.34 nm; a sixth layer of Rb having a thickness of 88.85 nm; a seventh layer of Ta$_2$O$_5$ having a thickness of 56.45 nm; an eighth layer of Rb having a thickness of 66.94 nm; a ninth layer of Ta$_2$O$_5$ having a thickness of 161.39 nm; a tenth layer of Rb having a thickness of 9.76 nm; an eleventh layer of Ta$_2$O$_5$ having a thickness of 68.17 nm; a twelfth layer of Rb having a thickness of 24.8 nm; and a thirteenth layer of Ta$_2$O$_5$ having a thickness of 52.85 nm;

or, a first layer of H$_4$ having a thickness of 249.19 nm; a second layer of Rb having a thickness of 12.2 nm; a third layer of H$_4$ having a thickness of 199.63 nm; a fourth layer of Rb having a thickness of 65.2 nm; a fifth layer of H$_4$ having a thickness of 197.8 nm; a sixth layer of Rb having a thickness of 88.85 nm; a seventh layer of H$_4$ having a thickness of 57.46 nm; an eighth layer of Rb having a thickness of 66.94 nm; a ninth layer of H$_4$ having a thickness of 164.26 nm; a tenth layer of Rb having a thickness of 9.76 nm; an eleventh layer of H$_4$ having a thickness of 69.39 nm; a twelfth layer of Rb having a thickness of 24.8 nm; and a thirteenth layer of H$_4$ having a thickness of 53.79 nm.

7. The optical filter structure of arbitrary combination of UV, R, G, B, and IR according to claim 2, wherein structural condition of the IR pixel filter film is one of the following:

a first layer of Ti$_3$O$_5$ having a thickness of 79.94 nm; a second layer of Rb having a thickness of 55.92 nm; a third layer of Ti$_3$O$_5$ having a thickness of 556.74 nm; a fourth layer of Rb having a thickness of 19.13 nm; a fifth layer of Ti$_3$O$_5$ having a thickness of 169.04 nm; a sixth layer of Rb having a thickness of 80.55 nm; a seventh layer of Ti$_3$O$_5$ having a thickness of 139.86 nm; an eighth layer of Rb having a thickness of 36.53 nm; a ninth layer of Ti$_3$O$_5$ having a thickness of 350.46 nm; a tenth layer of Rb having a thickness of 109.85 nm; an eleventh layer of Ti$_3$O$_5$ having a thickness of 122.52 nm; a twelfth layer of Rb having a thickness of 35.63 nm; a thirteenth layer of Ti$_3$O$_5$ having a thickness of 171.98 nm; a fourteenth layer of Rb having a thickness of 63.02 nm; and a fifteenth layer of Ti$_3$O$_5$ having a thickness of 263.23 nm;

or, a first layer of TiO$_2$ having a thickness of 78.76 nm; a second layer of Rb having a thickness of 55.92 nm; a third layer of TiO$_2$ having a thickness of 548.52 nm; a fourth layer of Rb having a thickness of 19.13 nm; a fifth layer of TiO$_2$ having a thickness of 166.54 nm; a sixth layer of Rb having a thickness of 80.55 nm; a seventh layer of TiO$_2$ having a thickness of 137.8 nm; an eighth layer of Rb having a thickness of 36.53 nm; a ninth layer of TiO$_2$ having a thickness of 345.29 nm; a tenth layer of Rb having a thickness of 109.85 nm; an eleventh layer of TiO$_2$ having a thickness of 120.71 nm; a twelfth layer of Rb having a thickness of 35.63 nm; a thirteenth layer of TiO$_2$ having a thickness of 169.44 nm; a fourteenth layer of Rb having a thickness of 63.02 nm; and a fifteenth layer of TiO$_2$ having a thickness of 262.83 nm;

or, a first layer of Ta$_2$O$_5$ having a thickness of 87.03 nm; a second layer of Rb having a thickness of 55.92 nm; a third layer of Ta$_2$O$_5$ having a thickness of 606.16 nm; a fourth layer of Rb having a thickness of 19.13 nm; a fifth layer of Ta$_2$O$_5$ having a thickness of 184.04 nm; a sixth layer of Rb having a thickness of 80.55 nm; a seventh layer of Ta$_2$O$_5$ having a thickness of 152.28 nm; an eighth layer of Rb having a thickness of 36.53 nm; a ninth layer of Ta$_2$O$_5$ having a thickness of 381.57 nm; a tenth layer of Rb having a thickness of 109.85 nm; an eleventh layer of Ta$_2$O$_5$ having a thickness of 133.4 nm; a twelfth layer of Rb having a thickness of 35.63 nm; a thirteenth layer of Ta$_2$O$_5$ having a thickness of 187.25 nm; a fourteenth layer of Rb having a thickness of 63.02 nm; and a fifteenth layer of Ta$_2$O$_5$ having a thickness of 286.6 nm;

or, a first layer of H$_4$ having a thickness of 87.04 nm; a second layer of Rb having a thickness of 55.92 nm; a third layer of H$_4$ having a thickness of 606.22 nm; a fourth layer of Rb having a thickness of 19.13 nm; a fifth layer of H$_4$ having a thickness of 184.06 nm; a sixth layer of Rb having a thickness of 80.55 nm; a seventh layer of H$_4$ having a thickness of 152.29 nm; an eighth layer of Rb having a thickness of 36.53 nm; a ninth layer of H$_4$ having a thickness of 381.61 nm; a tenth layer of Rb having a thickness of 109.85 nm; an eleventh layer of H$_4$ having a thickness of 133.41 nm; a twelfth layer of Rb having a thickness of 35.63 nm; a thirteenth layer of H$_4$ having a thickness of 187.26 nm; a fourteenth layer of Rb having a thickness of 63.02 nm; and a fifteenth layer of H$_4$ having a thickness of 286.62 nm.

8. A method for manufacturing an optical filter structure of arbitrary combination of UV, R, G, B, and IR, comprising a process of the following steps:

(a) forming photoresist mask on substrate: forming a photoresist mask on a surface of a substrate, such that a plurality of hollowed film-coating zones are formed in portions of the photoresist mask in which pixel filter films are to be coated;

(b) vacuum coating: performing an operation of vacuum coating to form, in the film-coating zones, a plurality of pixel filter films, which are formed by alternately stacking a plurality of rubidium (Rb) layers and a plurality of high refractive index layers, which are of different thicknesses;

(c) coating photoresist: coating photoresist on the hollowed film-coating zones that have been coated with the pixel filter films, in order to seal the hollowed film-coating zones;

(d) etching: performing an operation of etching to form a plurality of additional hollowed film-coating zones, in which a plurality of additional pixel filter films are to be coated, in portions of the photoresist mask;

(e) vacuum coating again: performing an operation of vacuum coating to form, in the plurality of additional film-coating zones formed through the operation of etching, a plurality of additional pixel filter films, which are formed by alternately stacking a plurality of rubidium (Rb) layers and a plurality of high refractive index layers, which are of different thicknesses; and (f) removing photoresist mask: removing the photoresist mask to complete the process; and wherein the optical filter structure is formed as a combination of two arbitrary ones of pixel filter films of UV, R, G, B, and IR by controlling a coating thickness of each of the layers in step (b) and step (e).

9. The method for manufacturing the optical filter structure of arbitrary combination of UV, R, G, B, and IR according to claim 8, wherein, after step (e), steps (c)-(e) are selectively repeated before step (f), so that the optical filter structure is formed as a combination of three or multiple arbitrary ones of pixel filter films of UV, R, G, B, and IR by controlling a coating thickness of each of the layers in step (b) and step (e).

10. The method for manufacturing the optical filter structure of arbitrary combination of UV, R, G, B, and IR according to claim 9, wherein step (a) comprises steps of (a1) spin-coating of photoresist; (a2) soft baking; (a3) exposure; (a4) soft baking; (a5) development; (a6) soft baking; and (a7) cleansing.

11. The method for manufacturing the optical filter structure of arbitrary combination of UV, R, G, B, and IR according to claim 9, wherein the operations of vacuum coating of step (b) and step (e) are performed in a reactive vacuum sputtering coating system, in which rubidium (Rb) and a high refractive index material having a refractive index higher than rubidium are used as target materials of sputtering, wherein a process of the operations comprises (A) placing a clean substrate on a roller, such that a film coating side faces outwards; (B) making the roller rotating in a film coating chamber at a constant speed; (C) activating a corresponding one of the target materials and introducing argon when vacuum reaches 10-3 Pa to 10-5 Pa, such that under an electric field, the target material is bombarded to form ions that attach to the substrate; (D) allowing the substrate to be brought, with the rotation of the roller, toward a reaction source zone; and (E) supplying oxygen or argon to the reaction source zone to form plasma, which, upon by an electric field, moves at a high speed toward the substrate to eventually form a rubidium (Rb) layer or a high refractive index film on the substrate.

12. The method for manufacturing the optical filter structure of arbitrary combination of UV, R, G, B, and IR according to claim 11, wherein the high refractive material having a refractive index higher than rubidium (Rb) is one of titanium pentoxide ($Ti_3O_5$), titanium dioxide ($TiO_2$), niobium pentoxide ($Nb_2O_5$), tantalum pentoxide ($Ta_2O_5$), and a mixture film material ($H_4$), and a mixture thereof.

13. The method for manufacturing the optical filter structure of arbitrary combination of UV, R, G, B, and IR according to claim 11, wherein the coating thickness of each of the layers is controllable through controlling a count of seconds within which coating is applied for such a layer, and the longer the time, the greater the coating thickness.

14. The method for manufacturing the optical filter structure of arbitrary combination of UV, R, G, B, and IR according to claim 11, wherein oxygen supplied in forming the rubidium (Rb) film takes a volume percentage of 10% to 90% of a sum of oxygen and argon so supplied, so that the film so formed has a refractive index of 0.25 to 0.13 and an extinction coefficient of 0.24 to 5.58 in a wavelength range of 350 nm to 2000 nm; and oxygen supplied for operation in connection with the high refractive index material takes a volume percentage of 10% to 90% of a sum of oxygen and argon so supplied, so that the high refractive index film so formed has a refractive index varying from 1.3 to 2.5 in 350 nm to 1100 nm and an extinction coefficient close to 0.

15. The method for manufacturing the optical filter structure of arbitrary combination of UV, R, G, B, and IR according to claim 8, wherein step (a) comprises steps of (a1) spin-coating of photoresist; (a2) soft baking; (a3) exposure; (a4) soft baking; (a5) development; (a6) soft baking; and (a7) cleansing.

16. The method for manufacturing the optical filter structure of arbitrary combination of UV, R, G, B, and IR according to claim 8, wherein the operations of vacuum coating of step (b) and step (e) are performed in a reactive vacuum sputtering coating system, in which rubidium (Rb) and a high refractive index material having a refractive index higher than rubidium are used as target materials of sputtering, wherein a process of the operations comprises (A) placing a clean substrate on a roller, such that a film coating side faces outwards; (B) making the roller rotating in a film coating chamber at a constant speed; (C) activating a corresponding one of the target materials and introducing argon when vacuum reaches 10-3 Pa to 10-5 Pa, such that under an electric field, the target material is bombarded to form ions that attach to the substrate; (D) allowing the substrate to be brought, with the rotation of the roller, toward a reaction source zone; and (E) supplying oxygen or argon to the reaction source zone to form plasma, which, upon by an electric field, moves at a high speed toward the substrate to eventually form a rubidium (Rb) layer or a high refractive index film on the substrate.

17. The method for manufacturing the optical filter structure of arbitrary combination of UV, R, G, B, and IR according to claim 16, wherein the high refractive material having a refractive index higher than rubidium (Rb) is selected from the group consisting of titanium pentoxide ($Ti_3O_5$), titanium dioxide ($TiO_2$), niobium pentoxide ($Nb_2O_5$), tantalum pentoxide ($Ta_2O_5$), a mixture film material ($H_4$), and mixtures thereof.

18. The method for manufacturing the optical filter structure of arbitrary combination of UV, R, G, B, and IR according to claim 16, wherein the coating thickness of each of the layers is controllable through controlling a count of seconds within which coating is applied for such a layer, and the longer the time, the greater the coating thickness.

19. The method for manufacturing the optical filter structure of arbitrary combination of UV, R, G, B, and IR according to claim 16, wherein oxygen supplied in forming the rubidium (Rb) film takes a volume percentage of 10% to 90% of a sum of oxygen and argon so supplied, so that the film so formed has a refractive index of 0.25 to 0.13 and an extinction coefficient of 0.24 to 5.58 in a wavelength range of 350 nm to 2000 nm; and oxygen supplied for operation in connection with the high refractive index material takes a volume percentage of 10% to 90% of a sum of oxygen and argon so supplied, so that the high refractive index film so formed has a refractive index varying from 1.3 to 2.5 in 350 nm to 1100 nm and an extinction coefficient close to 0.

\* \* \* \* \*